(12) United States Patent    (10) Patent No.:   US 12,589,871 B2

Evulet      (45) Date of Patent:    Mar. 31, 2026

(54) CONFIGURATION FOR VERTICAL TAKE-OFF AND LANDING SYSTEM FOR AERIAL VEHICLES

(71) Applicant: JETOPTERA, INC., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 0 days.

(21) Appl. No.: 18/898,692

(22) Filed: Sep. 27, 2024

(65) Prior Publication Data

US 2025/0145286 A1     May 8, 2025

Related U.S. Application Data

(63) Continuation of application No. 18/218,964, filed on Jul. 6, 2023, now abandoned, which is a continuation of application No. 17/475,280, filed on Sep. 14, 2021, now Pat. No. 11,724,803, which is a continuation of application No. 16/020,116, filed on Jun. 27, 2018, now Pat. No. 11,148,801.

(60) Provisional application No. 62/525,592, filed on Jun. 27, 2017.

(51) Int. Cl.
| | |
|---|---|
| *B64C 29/04* | (2006.01) |
| *B64C 3/10* | (2006.01) |
| *B64C 5/06* | (2006.01) |
| *B64C 15/12* | (2006.01) |
| *B64C 39/06* | (2006.01) |
| *B64C 39/12* | (2006.01) |
| *B64D 33/04* | (2006.01) |

(52) U.S. Cl.
CPC ................ *B64C 29/04* (2013.01); *B64C 3/10* (2013.01); *B64C 5/06* (2013.01); *B64C 15/12* (2013.01); *B64C 39/066* (2013.01); *B64C 39/12* (2013.01); *B64D 33/04* (2013.01)

(58) Field of Classification Search
CPC .. B64C 29/04; B64C 3/10; B64C 5/06; B64C 15/12; B64C 39/066; B64C 39/12; B64D 33/04

See application file for complete search history.

(56) References Cited

U.S. PATENT DOCUMENTS

| | | | | |
|---|---|---|---|---|
| D203,283 S | * | 12/1965 | Woods et al. | .............. 280/281.1 |
| D239,522 S | * | 4/1976 | Wheatley | ..................... D12/335 |
| D312,068 S | * | 11/1990 | Moller | .......................... D12/326 |

(Continued)

*Primary Examiner* — Justin M Benedik
(74) *Attorney, Agent, or Firm* — PG Scott Born; FISHERBROYLES, LLP

(57) ABSTRACT

A vehicle includes a main body. A fluid generator is coupled to the main body and produces a fluid stream. At least one tad conduit is fluidly coupled to the generator. First and second fore ejectors are coupled to the main body and respectively coupled to a starboard side and port side of the vehicle. The fore ejectors respectively comprise an outlet structure out of which fluid flows. At least one tail ejector is fluidly coupled to the tail conduit. The tail ejector comprises an outlet structure out of which fluid flows A primary airfoil element includes a closed wing having a leading edge and a trailing edge. The leading and trailing edges of the closed wing define an interior region. The at least one propulsion device is at least partially disposed within the interior region.

19 Claims, 15 Drawing Sheets

(56)　　　　　　References Cited

U.S. PATENT DOCUMENTS

| | | | | |
|---|---|---|---|---|
| 5,086,993 | A * | 2/1992 | Wainfan | B64C 3/385 |
| | | | | 244/34 A |
| RE36,487 | E * | 1/2000 | Wainfan | B64C 39/062 |
| | | | | 244/34 A |
| 6,474,604 | B1 * | 11/2002 | Carlow | B64C 39/062 |
| | | | | 244/45 R |
| D500,981 | S * | 1/2005 | Wilding | D12/319 |
| 8,371,520 | B2 * | 2/2013 | Easter | B64C 25/405 |
| | | | | 244/49 |
| D736,140 | S * | 8/2015 | Moller | D12/330 |
| 9,308,984 | B2 * | 4/2016 | Suokas | B64C 1/26 |
| D856,898 | S * | 8/2019 | Evulet | D12/335 |
| 10,464,668 | B2 * | 11/2019 | Evulet | B64D 27/20 |
| D868,627 | S * | 12/2019 | Evulet | D12/319 |
| 2017/0240275 | A1 * | 8/2017 | Evulet | B64C 21/00 |
| 2018/0178899 | A1 * | 6/2018 | Har | B64U 50/19 |
| 2018/0305007 | A1 * | 10/2018 | Evulet | B64D 27/18 |
| 2018/0354613 | A1 * | 12/2018 | Cvrlje | B64C 39/068 |
| 2018/0354614 | A1 * | 12/2018 | Tunekawa | B64C 27/20 |
| 2018/0370627 | A1 * | 12/2018 | Evulet | B64C 39/066 |

* cited by examiner

CONFIGURATION FOR VERTICAL TAKE-OFF AND LANDING SYSTEM FOR AERIAL VEHICLES

PRIORITY CLAIM AND CROSS-REFERENCE TO RELATED APPLICATIONS

This application is a continuation of U.S. patent application Ser. No. 18/218,964 filed Jul. 6, 2023, which is a continuation of U.S. patent application Ser. No. 17/475,280 (now U.S. Pat. No. 11,724,803) filed Sep. 14, 2021, which is a continuation of U.S. patent application Ser. No. 16/020, 116 (now U.S. Pat. No. 11,148,801) filed Jun. 27, 2018, which application claims priority to U.S. Provisional Patent Application Ser. No. 62/525,592 filed Jun. 27, 2017, the contents of which are hereby incorporated by reference as if fully set forth herein This application claims the benefit of U.S. Provisional Patent Application Ser. No. 62/263,407, entitled MICRO-TURBINE GAS GENERATOR AND PROPULSIVE SYSTEM, filed Dec. 4, 2015 ("the '407 Provisional Application) and U.S. patent application Ser. No. 15/368,428 filed Dec. 2, 2016 ("the '428 Application"). The '407 Provisional Application and '428 Application are herein incorporated by reference in their entireties. This application also claims the benefit of U.S. patent application Ser. No. 15/221,389, entitled FLUIDIC PROPULSIVE SYSTEM, filed Jul. 27, 2016 ("the '389 Application") and U.S. patent application Ser. No. 15/256,178 filed Sep. 2, 2016 ("the '178 Application"), each application of which is hereby incorporated by reference as if fully set forth herein.

COPYRIGHT NOTICE

BACKGROUND

Every VTOL aircraft faces the challenges of sizing of the engine(s) and the balance of forces. See Daniel Raymer, Aircraft Design: A Conceptual Approach (AIAA Education Series), page 754 (5th ed. 2012).

Vertical take-off can be achieved with a high thrust-to-weight ratio. In contrast, during horizontal flight (cruise), lift forces contribute to the aircraft, and the thrust requirements are much smaller. However, if the intent is to design an aircraft that flies horizontally for a period of time, the VTOL requirement would make the engine requirements too limiting, adding a lot of weight that is then carried around in cruise conditions without functionality. Therefore, the sizing of the engine and thrust matching for a cruise-dominated VTOL aircraft becomes a major issue.

Balance is one of the most important drivers for the design of a VTOL aircraft. During the take-off phase, the thrust has to be distributed around the aircraft, and moments are balanced around the center of mass, in order for the aircraft to remain balanced. The aircraft cannot be balanced if the source of the thrust is in only one location. For example, even when a horizontal aircraft such as the Harrier is balanced in air, the aircraft needs to employ several thrust generating elements in locations specifically chosen in order to cancel out the moments at all times (calculated as force (thrust)×moment arm around the center of the aircraft mass). This is difficult to achieve if the majority of the thrust is located, for instance, in the rear portion of the aircraft (as typically found in a VTOL aircraft).

BRIEF DESCRIPTION OF THE DRAWING FIGURES

DETAILED DESCRIPTION

Figure 1:
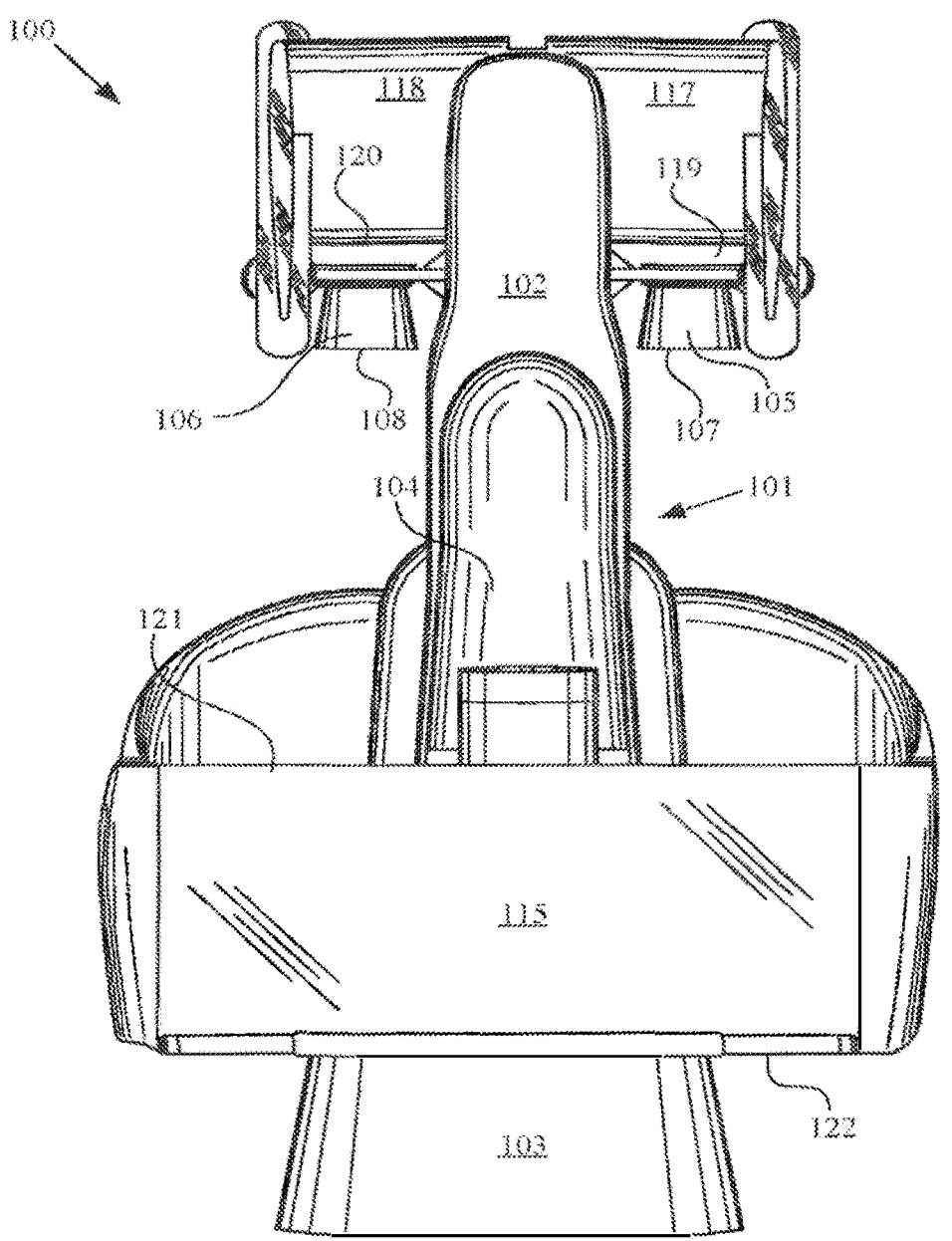
FIG. 1 illustrates a top view of an embodiment of the present invention.

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

The present application relates generally to thrust augmentation for unmanned aerial vehicles. In particular, one or more embodiments of the present invention disclosed in this application provide unique solutions to the challenges of vertical take-off and landing (VTOL) and short take-off and landing (STOL) aircrafts. As used herein, the terms "Tail-sitter" and "Flying Vehicle" may refer to one or more embodiments of the present invention.

An embodiment of the present invention addresses the issue of thrust-to-weight ratio and sizing of the engine through enhancing and augmenting the thrust. In a preferred embodiment of the present invention, the ejectors/thrusters themselves are designed to allow for augmentation exceeding 2:1 and close to 3:1. This means that these thrusters are designed to produce a thrust that is 2-3 times greater than the thrust produced by a conventional turbojet. Thrust augmentation designs are disclosed in U.S. patent application Ser. No. 15/221,389, entitled FLUIDIC PROPULSIVE SYSTEM, filed Jul. 27, 2016 ("the '389 Application") and U.S. patent application Ser. No. 15/256,178 filed Sep. 2, 2016 ("the '178 Application"), each application of which is hereby incorporated by reference as if fully set forth herein. As used herein, "thrusters" shall refer to such ejectors/thrusters with significant augmentation that are described in the '389 Application as well as any subsequent versions or improvements thereof.

In a preferred embodiment of the present invention, the Thruster is used with a gas generator as a source for primary flows. While it is not necessary to utilize such a Thruster with a gas generator that supplies the primary flow in the present invention, utilizing such a Thruster can enhance the effects of thrust augmentation.

Further augmentation can be achieved through a secondary, major ejector that can be formed by using the exhaust from the Thrusters in conjunction with, for example, a closed/box wing of the Tailsitter acting as a shroud. The wings may also take any other shape that is designed in such a way to allow the high-speed exhaust of the Thrusters to serve as primary nozzle for the ejector formed b the wing ("shroud") and Thrusters. The effects of the shroud can further augment the thrust by at least 10-25%. In effect, the Thrusters and the shroud can have a combined effect of thrust augmentation of, for example, 1.1 (from shrouded thrusters) times 2.5 (from Thrusters) augmentation, which results in a total augmentation of 2.75. Therefore, such a system can produce a thrust that is equal to the weight of the aircraft at takeoff by augmenting an otherwise ~2.75 thrust generated by a simple turbojet.

In any aircraft which takes off vertically on its tail, the aircraft would naturally need to adjust its attitude to level off at the acceptable attitude and reduce its thrust in order to keep the aircraft flying forward at a constant cruise speed. Thrust reduction via throttle reduction may adjust the power needed to overcome the drag of the aircraft, which may also mean a lesser augmentation of the entire system and sufficient to propel the aircraft forward and maintain its speed.

In one embodiment of the present invention, a 150-lbs aircraft may employ a 75-lbf turbojet adapted to become a gas generator. This concept is disclosed in U.S. Provisional Patent Application Ser. No. 62/263,407, entitled MICRO-TURBINE GAS GENERATOR AND PROPULSIVE SYSTEM, filed Dec. 4, 2015 ("the '407 Provisional Application) and U.S. patent application Ser. No. 15/368,428 filed Dec. 2, 2016 ("the '428 Application"). The '407 Provisional Application and '428 Application are herein incorporated by reference in their entireties. In this embodiment, these thrust augmenting ejectors can produce an augmentation of, for example, 1.75 times the original, which means 75 multiplied by 1.75, which results in 131.25 lbf augmented thrust. Without a shroud around the Thruster, the thrust may be limited to this value and may not allow the thrust to lift the aircraft off the ground. However, with a wing such as a boxed structure around the main Thruster(s) to shroud these Thrusters, the overall augmentation of the thrust becomes, for example, e.g., 1.15 multiplied by 131.25, resulting in 150.94 lbf, and hence exceeds the weight of the aircraft and allows for the take-off.

As the fuel is consumed on board the Tailsitter, the weight of the vehicle becomes lighter and the acceleration of the vehicle becomes larger, so the take-off happens at increasing speed and acceleration. Because the vehicle may not be inhabited, the accelerations may exceed the current human-limited accelerations that are restricted for human safety and non-life threatening standards. In one embodiment, the accelerations may exceed 20 times the gravitational acceleration. As such, after a short time, the vehicle may have the ability to change its attitude and achieve level flight by throttle and control surface changes. Lift increases as the vehicle changes its attitude, while the combined augmentation also diminishes in value due to the throttle pull back. The Tailsitter may then achieve level flight by concomitantly reducing the engine load (ergo gas generator primary stream) to the thrusters in the first level and allowing the boxed wing to produce the proper lift to maintain the attitude, while the thrusters produce enough thrust to overcome drag.

Conversely, on approach to the destination, the attitude of the aircraft can be adjusted with an increase angle of attack and the thrust augmentation again displaces the need for lift, as the forward speed reduces and the aircraft eventually can land vertically, on its tail portion, balanced by the thrusters and its combined augmentation effect.

One or more embodiments of the present invention are able to overcome the issue of balancing the forces and moments by having smaller moment arms than are needed to balance them around the center of mass, which is achieved by having a distribution of thrust across various locations in the aircraft. This, in turn, allows these embodiments to have more control and makes it easier to maintain a hover/upright position.

As discussed in the '389 and '407 Applications, the unique technology allows for the distribution of thrust across various locations of the aircraft, with augmentation levels achieved in various thrusters (e.g., in front, "fore ejectors" behind canard wings, employed at hovering phases take-off and landing and turned off at level flight, and in the back the "tail ejectors" that generate the bulk of the thrust).

A conventional small (<250 lbf thrust) mini jet engine usually provides thrust at a single location, typically at the center of the exhaust section. Some small turbofans also provide the thrust in a concentrated point on the aircraft. One or more embodiments of the present invention allow the distribution of the thrust in a nearly linear and/or non-circular manner, as opposed to a circular manner, and thus distribute the thrust per the length of a wing or other airfoils and/or control surfaces of an aircraft. In the Tailsitter, both the main, hot stream and the bleed air portion of the stream from the compressor are used as motive fluids for the augmenting thrusters. Because this embodiment allows the distribution of the thrust in a linear, mainly non-circular and distributed, not at a concentrated point, it achieves better propulsive efficiency of the aircraft. In addition, there is the optionally advantageous feature of molding and shaping the thruster according to the shape of the airfoils to obtain better performance (e.g., increasing the stall margin of a given canard wing if thruster is placed downstream of it, or augmenting the lift on a main wing if the thruster is placed at an optimal location upstream of said main wing). The distributed thrust therefore improves the performance of the aircraft by distributing an otherwise 75 lbf turbojet hot and fast stream from a concentrated location at the back of the turbojet engine to, for example, at least four locations on the aircraft. In this example, thrusters are mounted at these four locations on the vehicle in an optimal manner, such that they are (i) receiving the pressurized air or gas stream from the compressor bleed system and exhaust of the gas generator respectively and (ii) augmenting each of the four thrust forces that would otherwise result from the simple isentropic expansion of the four primary streams by 1.5-3 times. This also results in an advantageous distributed flow and thrust from the four locations, thus enhancing the aircraft maneuverability and propulsive efficiency.

An embodiment (a turboprop STOL version) of the present invention includes augmentation of thrust based on motive fluid provided by a bleed system of a gas generator. The bleed system provides the port and starboard front thrusters with the motive air from the bleed. The front thrusters provide an augmentation corresponding to specific thrust of 100-300 lbf for each lb/sec of motive air provided by the bleed system. This value exceeds by far the typical 50-65 lbf/sec specific thrust obtained with small turbojet engines, due to limited efficiencies of the components and lack of advanced technologies. When turned into a gas generator, the value of the compressed air is utilized by employing the thrusters in front and back of the system resulting in augmentation ratios of over 2:1. As such, more thrust can be obtained from the same energy input.

In such an embodiment, a control valve is employed to provide the balance of flow between the port and starboard thrusters. The modulation of the air can be obtained with valves placed between the engine bleed and the control valve box. The valves allow for control of the flow on each thruster and/or balance of the how of the motive air between the two front thrusters by opening or closing a passage to one or both of the front thrusters and changing the motive fluid supply. This, in turn, generates an imbalance in thrust, and the imbalance results in the change in the aircraft attitude. The thrusters can also be swiveled around their main axis, while being modulated for primary flow (motive fluid flow) at the same time. This allows for control on the pitch and roll as well as some limited control on the yaw, and combinations thereof.

In an embodiment, thrusters are supplied a high pressure hot stream of exhaust gas delivered b the generator (minus the bleed air) via a transition piece or conduit. The transition piece connects the exhaust of the gas generator to the said rear thrusters. Thrusters use this delivery as a motive air to augment the thrust. This jet augmenting system is specifically designed to allow fast movement of the vehicle at the cost of additional fuel consumption, resulting in airspeeds of the vehicle exceeding 200 MPH and propulsive efficiencies of close to 80-90%. The system results in a typical specific fuel consumption of 0.8-1.1 lb/hr of fuel per lbf generated, which is typical of the low by-pass fans, but without a fan or turbine driving the fan. These levels are much more performant than the typical 1.5 lb/hr per lbf usually obtained with small turbojets, the majority of the current markets for drones. The system can also achieve the performance of specific fuel consumption of a low-bypass, turbofan at much smaller scale and without employing a free turbine and a fan, per se, reducing thus the weight and complexity of the entire propulsion system and eliminating a large, moving assembly such as the fan/free turbine assembly.

In an embodiment, if the mission of the aircraft is longer duration/range and slower airspeeds at higher propulsive efficiencies, then the rear section of the propulsive system can be made flexible enough to be replaced by a turbine/ propeller system while keeping the common, identical gas generator (front of the propulsive system) and augmenting "cold" thrusters. The turbine will receive the same flow as in the case of the jet augmenting system, but can extract the energy from the gas generator exhaust flow and turn it into mechanical work used to rotate the propeller rather than fluidically augment the flow in an ejector type thruster. The interfaces are very similar, the replacement consisting of the removal of the transition piece conduit with a conduit that guides the hot, pressurized gases towards the free turbine driving the propeller, after which the exhaust gases are expelled in the downstream direction and into the wash of the propeller. The advantage of such a flexible system is that with the similar arrangement, a turbopropeller pusher or a jet augmenting system can be interchangeable, allowing the user to choose the system based on the mission at hand. As such, a turbopropeller pusher system as described can achieve a specific fuel consumption level of below 0.6 lb/h per each horsepower or equivalent thrust lbf achieved. In one embodiment of the present invention, the UAV may be able to deliver a parcel as far as 200 miles away moving at an average cruise speed of 150 mph.

Furthermore, the propeller can be perfectly contained by, for example, the box wing system described herein, and thus the noise generated by the turboprop can be significantly reduced by direct box wing and indirect means (noise abatement materials inside the wing). In addition, the turboprop still benefits from the presence of the front thrusters and the use of bleed air to power them, allowing not only VTOL but where appropriate and VTOL not necessary, short take-off and landing.

In one or more embodiments of the present invention, the short take-off and landing (STOL) concept can be achieved by the employment of the front thrusters, significantly lowering the runway length required for take-off. By swiveling the thrusters, additional vectored thrust can be oriented to increase pitch during take-off and reduce the length needed as compared to a conventional aircraft. The front thrusters may be shut off during cruise or loitering, or re-activated at various stages of the flight, to augment lift, or thrust or both. The augmentation of the thrust can be accomplished through the very design of the thrusters. The augmentation of the lift can be accomplished by the placement of the front thrusters in relation to both the canard (front wings) and the main box wing. The downstream location of the front thrusters delays stall of the canard wings, allowing operation at higher angles of attack and higher lift coefficients before stall occurs. This is due to the lower pressure created in front of the thrusters, delaying the separation on the top of the wing, the Rain cause of stall on most wings at high angles of attack. The lift augmentation due to the main wing is mainly due to the increased flow resulting from the front thrusters, locally higher than the airspeed of the vehicle, which said flow is guided over the bottom part of the box wing and, as known to those familiar with the matter, augmenting the Lift of the main wing.

Figures 2, 3:
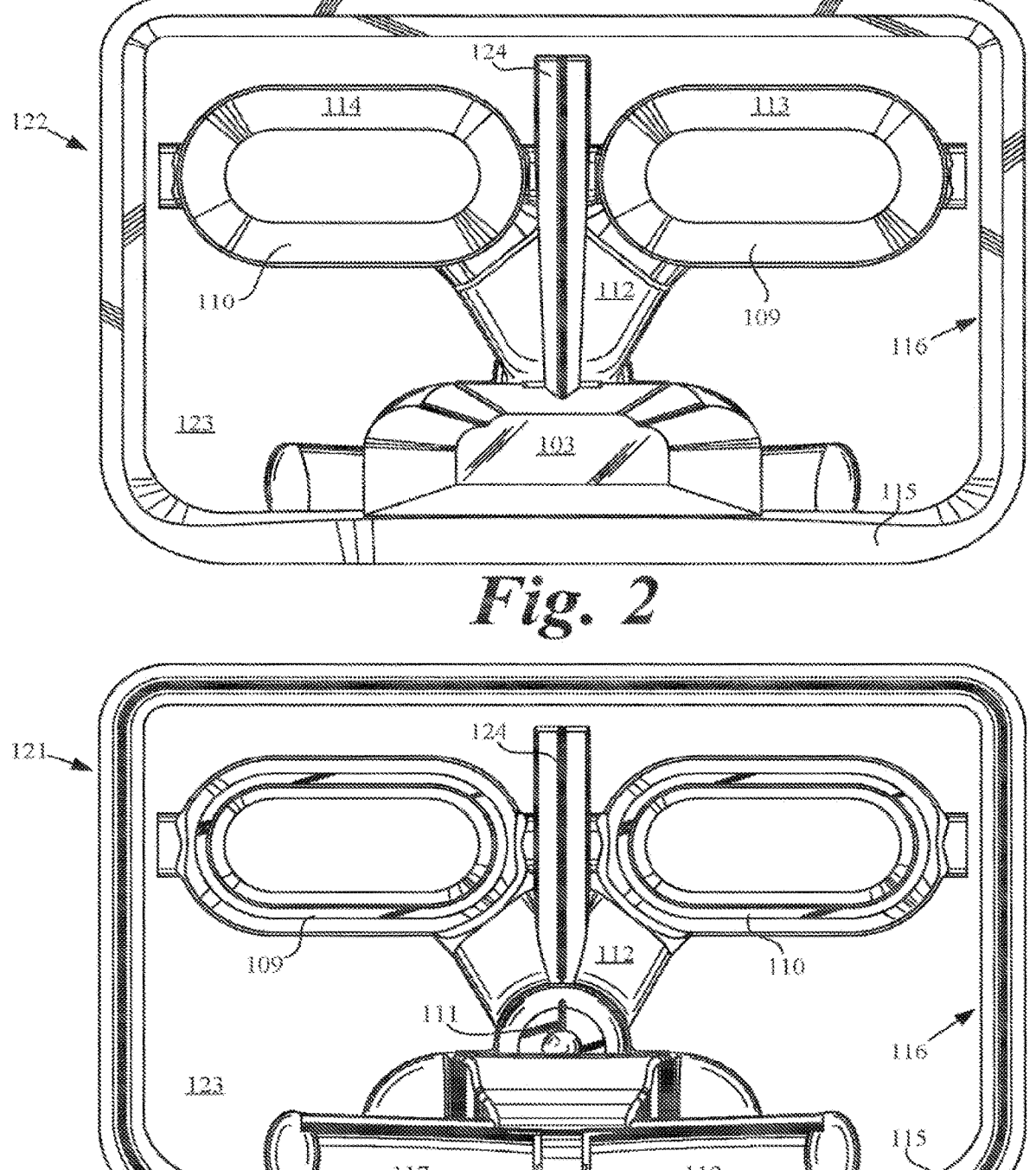
FIG. 2 is a rear view of the embodiment of the present invention shown in FIG. 1.
FIG. 3 is a front view of the embodiment of the present invention shown in FIG. 1.

FIGS. 1-3 illustrate a vehicle 100 according to an embodiment Of the invention from different perspective views. In FIGS. 1-3, the vehicle 100 has a jet augmenting propulsive system with particular emphasis on VTOL capabilities. More specifically, vehicle 100 includes a main body 101 having a fore portion 102 and a tail portion 103. Main body 101 may include a cockpit portion (not shown configured to enable manned operation of the vehicle 100. As with all flying/sailing craft, vehicle 100 has a starboard side and a port side. A fluid generator 104 is coupled to the main both 101 and produces a fluid stream. In an embodiment, the fluid generator 104 is disposed in the main body 101. At least one fore conduit (111 in FIG. 3) and at least one tail conduit 112 are fluidly coupled to the generator 104.

First and second fore ejectors 105, 106 are fluidly coupled to the at least one fore conduit 111, coupled to the fore portion 102 and respectively coupled to the starboard side and port side. The fore ejectors 105, 106 respectively include outlet structure 107, 108 out of which fluid from the at least one fore conduit 111 flows at a predetermined adjustable velocity. Additionally, the entirety of each of the fore ejectors 105, 106 is rotatable about an axis oriented parallel to the leading edges of the fore ejectors (i.e., transverse axis) to provide thrust orientation with both forward and upward components, for example, allowing the vehicle 100 to take off and continue climbing at much steeper angles of attack and hence reducing the runway length needed. At the end of the climb or during the climb, the fore ejectors 105, 106 can be realigned to the main direction of flight or shut off completely by turning off the bleed valves of the engine/gas generator 104 and adapting the speed and operation of the gas generator accordingly, driving the rear propulsion system (e.g., tail ejectors 109, 110). After landing, the fore ejectors 105, 106 can be swiveled 180 degrees to provide a thrust reverse against the direction of the landing, shortening the landing length. In an embodiment, the entirety of each of the fore ejectors 105, 106 is rotatable about an axis oriented perpendicular to the leading edges of the fore ejectors.

First and second tail ejectors 109, 110 is fluidly coupled to the at least one tail conduit 112 and coupled to the tail portion 103. The tail ejectors 109, 110 include outlet structure 113, 114 out of which fluid from the at least one tail conduit 112 flows at a predetermined adjustable velocity. Additionally, the entirety of each of the tail ejectors 109, 110 is rotatable about an axis oriented parallel to the leading edges of the tail ejectors (i.e., transverse axis). In an embodiment, the entirety of each of the tail ejectors 109, 110 is rotatable about an axis oriented perpendicular to the leading edges of the tail ejectors.

In an embodiment, the fluid generator 104 includes a first region in which the fluid stream is at a low temperature and a second region in which the fluid stream is at a high temperature. The at least one fore conduit 111 provides fluid from the first region to the fore ejectors 105, 106, and the at least one tail conduit 112 provides fluid from the second region to the tail ejectors 109, 110.

A primary airfoil element 115 is coupled to the tail portion 103. Element 115 is located directly downstream of the fore ejectors 105, 106 such that the fluid from the fore ejectors flows over at least one aerodynamic surface of the primary airfoil element. In an embodiment, the primary airfoil element 115 is a closed wing having a leading edge 121 and a trailing edge 122, the leading and trailing edges of the closed wing defining an interior region 123. Tail ejectors 109, 110 are at least partially disposed within the interior region 123 (i.e., between leading edge 121 and trailing edge 122) and are controllably movable (e.g., advancement, retraction, etc.) within the interior region relative to the airfoil element 115. As such, a shroud is formed by primary airfoil element 115 around the tail ejectors 109, 110, thereby forming a macro-ejector.

The vehicle 100 further includes first and second canard wings 117, 118 coupled to the fore portion 102 and respectively coupled to the starboard side and port side. The canard wings 117, 118 are configured to develop boundary layers of ambient air flowing over the canard wings when the vehicle 100 is in motion. The canard wings 117, 118 are respectively located directly upstream of the fore ejectors 105, 106 such that the fore ejectors are fluidly coupled to the boundary layers. The fore ejectors 105, 106 respectively include inlet portions (i.e., leading edges) 119, 120, and the fore ejectors are positioned such that the boundary layers are ingested by the inlet portions.

Figure 4:
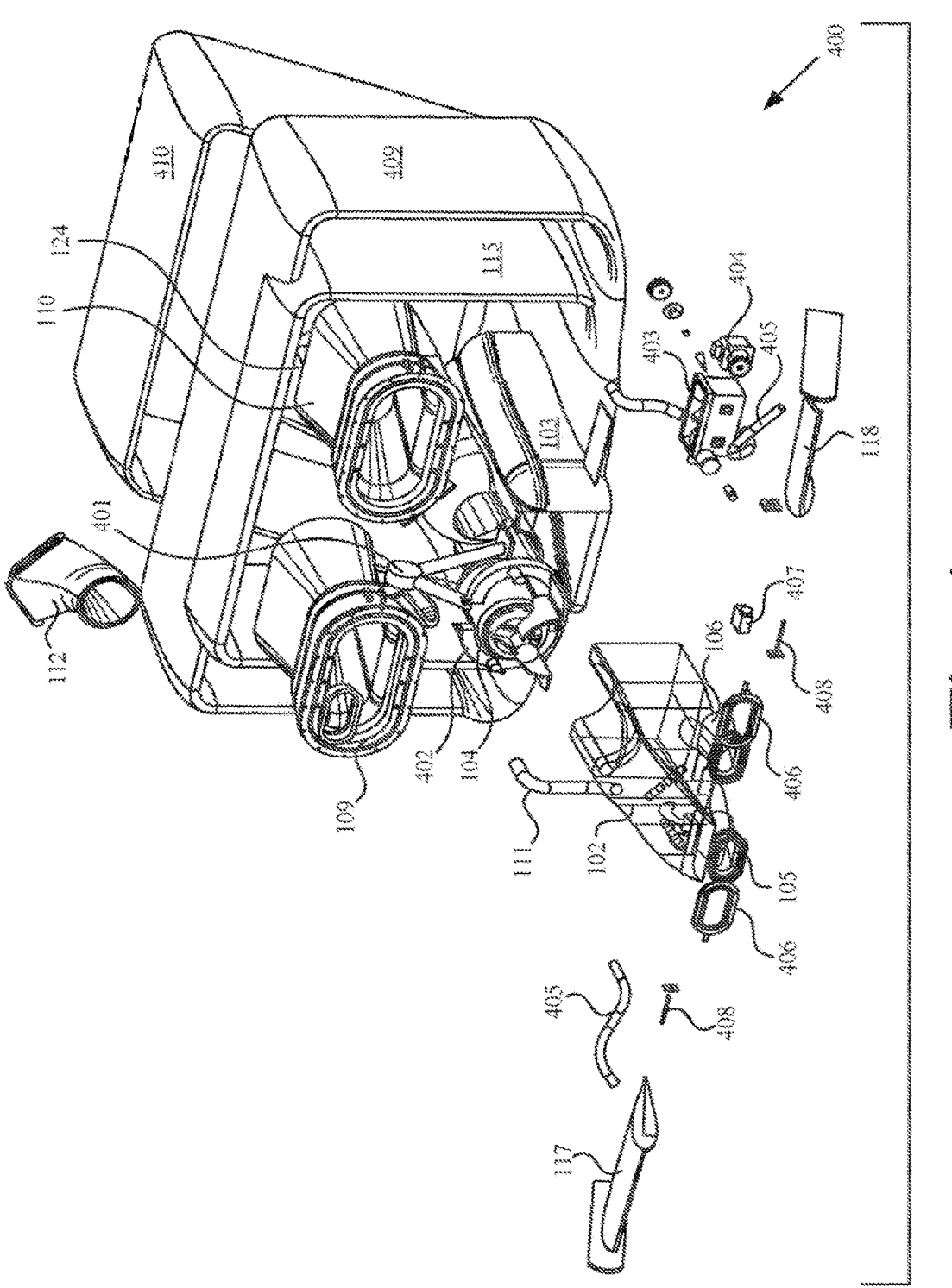
FIG. 4 illustrates ern alternative embodiment of the present invention in an exploded isometric view.

FIG. 4 illustrates in exploded view a vehicle 400 according to an alternative embodiment. For the sake of brevity, elements illustrated in FIG. 4 having characteristics identical to their counterparts illustrated in FIGS. 1-3 are denoted using the same reference numeral. Vehicle 400 includes a fluid generator 104, tail ejectors 109, 110, a tail conduit 112 to guide hot pressurized exhaust gas to the tail ejectors, and a rear thruster support strut 401. Vehicle 400 further includes canard wings 117, 118, a bleed air manifold 402 and a fore conduit 111 linking the bleed air manifold to a control valve box 403 having a motor control valve 404 that modulates both fluid flow to fore ejectors 105, 106 and balance of the primary flow supply between the fore ejectors. Flexible lines 405 guide compressed bleed air from control valve box 403 to fore ejectors 105, 106. Each of fore ejectors 105, 106 includes a flange 406 and a motor 407 for swiveling the fore ejectors about shaft 408.

Vehicle 400 further includes primary airfoil element 115 with control surfaces such as rudders, elevons, elevators, etc., an additional closed-wing airfoil element 409, and a secondary closed-wing airfoil element 410. The secondary airfoil element 410 has a leading edge located directly downstream of the outlet structure 113, 114 of tail ejectors 109, 110 such that the fluid from the tail ejectors flow over a surface of the at least one secondary airfoil element. Vehicle 400 further includes a central fin and rudder 124, tail portion 103 carrying tank, fluid generator 104, and controls, and fore portion 102.

Figure 5:
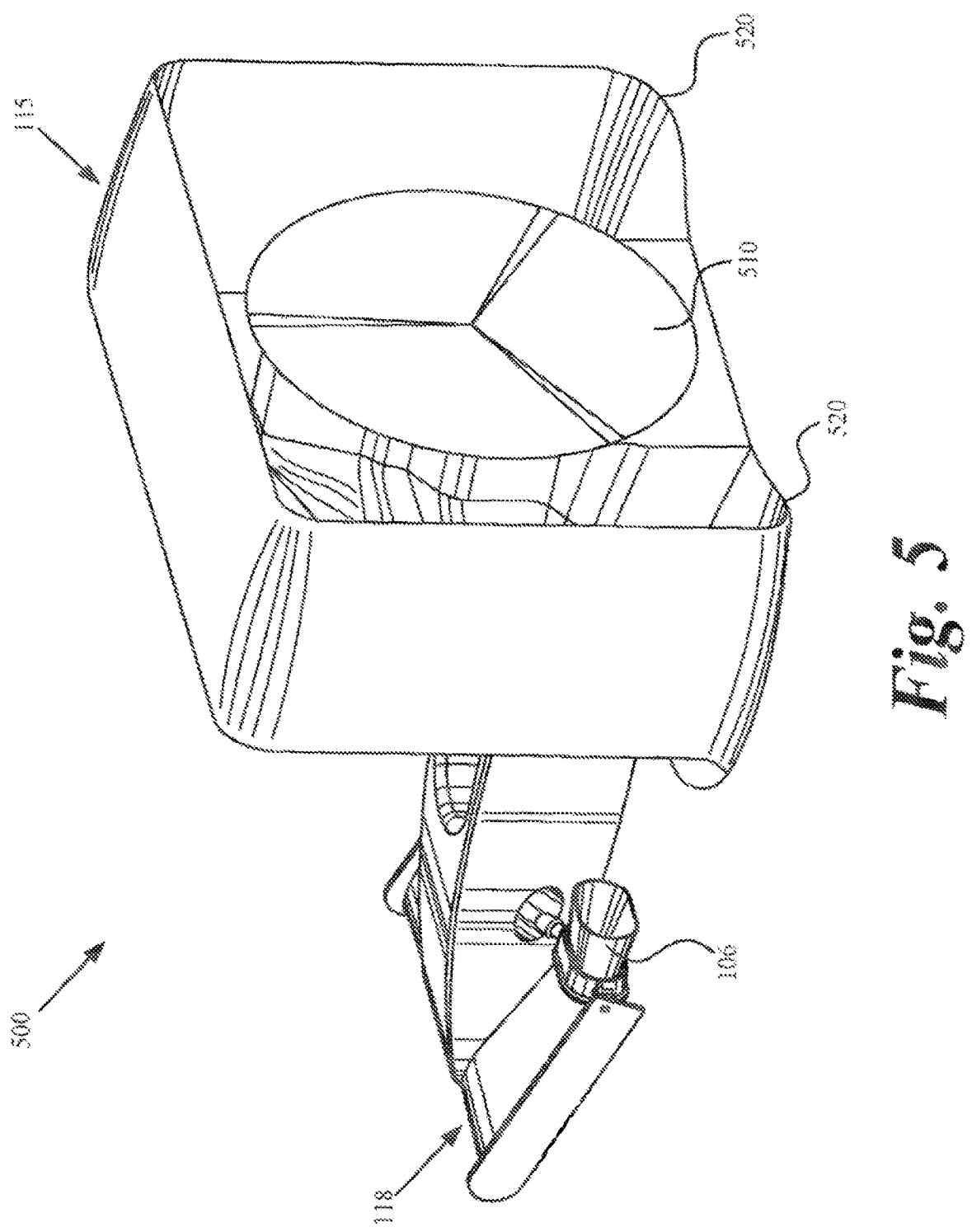
FIG. 5 illustrates an alternative embodiment of the present invention in rear perspective view.
Figures 6A, 6B, 6C, 6D:
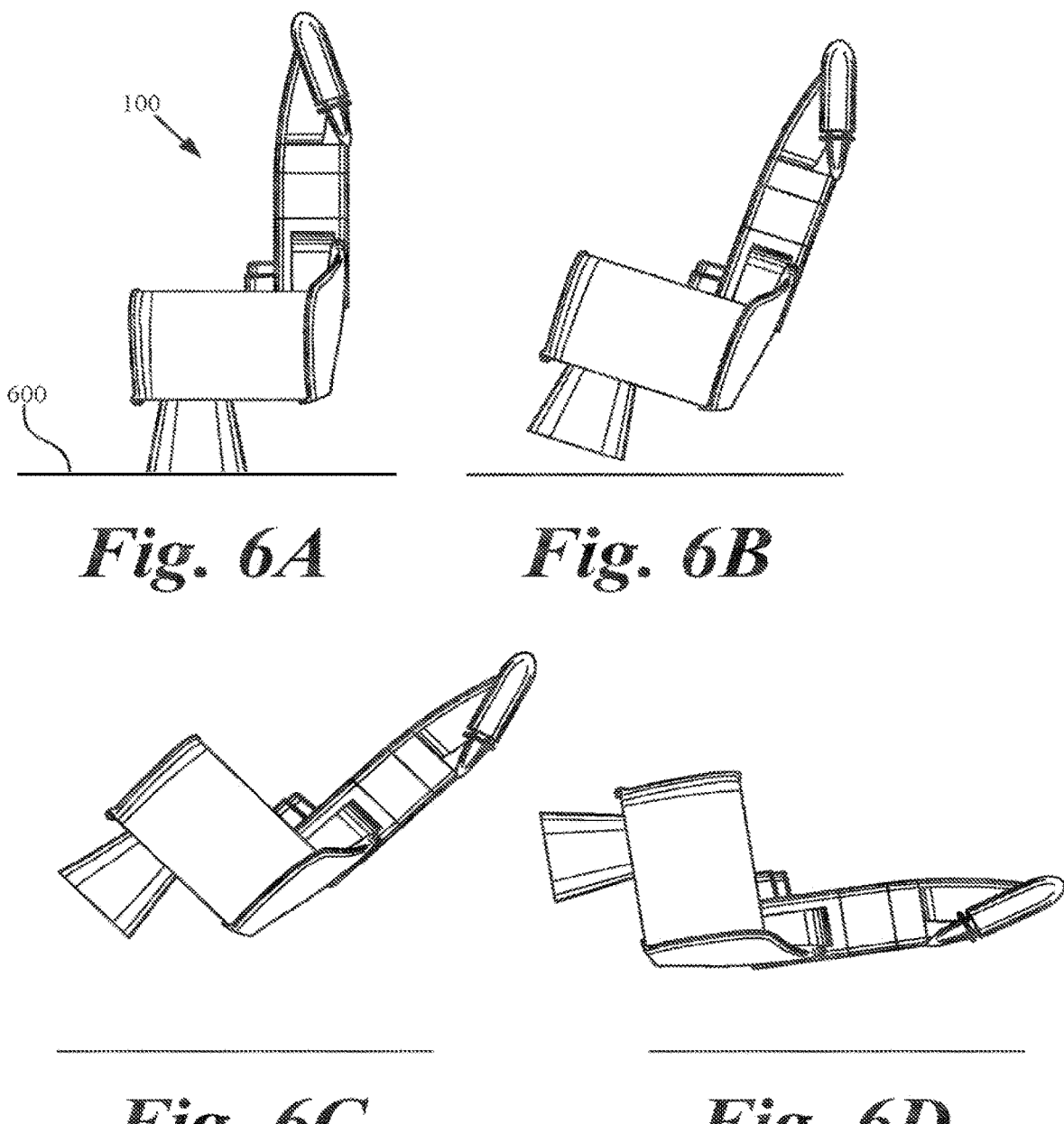
FIGS. 6A-6D illustrate the progression of an embodiment of the present invention from take-off to level flight relative to a landing/takeoff surface.

FIG. 5 illustrates a vehicle 500 according to an alternative embodiment. For the sake of brevity, elements illustrated in FIG. 5 having characteristics identical to their counterparts illustrated in FIGS. 1-3 are denoted using the same reference numeral. Vehicle 500 includes a turbo-propeller propulsive system with particular emphasis on short take-off and landing (STOL) capabilities. Vehicle 500 includes all of the features of vehicle 100 except for tail ejectors 109, 110. Instead, vehicle 500 includes a propeller 510 driven by a turbine (not shown), which is in turn powered by fluid generator 104. An embodiment can include a support assembly 520, such as legs or other appropriate device, that provide support to vehicle 500 such that there is enough space and/or offset between the propeller 510 and a landing/takeoff surface when the vehicle 500 is at rest. Support assembly 520 preferably extends from the tail portion 103 and is substantially parallel to the main body 101.

FIGS. 6A-6D illustrate the progression from take-off to level flight relative to a landing/takeoff surface 600 of vehicle 100. The moveable fore ejectors 105, 106 may be responsible for the fine tuning of the vehicle 100 attitude in-flight up to level flight (cruise). One aspect of this embodiment is that the tail ejectors 109, 110, being larger and employing hot gases as primary fluid, do not necessarily need to swivel to control the attitude, while the fore ejectors 105, 106, being smaller and operating with colder gas from the compressor discharge or bleeds, can be swiveled to maintain the altitude and attitude of the vehicle 100 and drive its orientation in flight to the desired position and attitude. The fore ejectors 105, 106 could then be shut down from a central control valve that closes the bleed port, and/or retracted inside the fore portion 102, allowing the fluid generator 104 to operate at throttle pulled condition (less than 100% speed) and still generate hot gases in the back to supply the tail ejectors 109, 110 with primary fluid, bleed valve closed. An augmentation of 2:1 is still possible in level flight, with minor or no contribution from the boxed wing acting as shroud for the larger or macro-ejector formed by the tail ejectors 109, 110 and airfoil element 115 itself.

The advantageous effect of combining the tail ejectors 109, 110, which produce high-speed airflow, with the primary airfoil element 115 to generate additional thrust augmentation is particularly useful when taking-off in a tailsitter configuration. The tail ejectors 109, 110 become the primary nozzle of a classical ejector. Then the primary airfoil element 115, together with the tail ejectors 109, 110 to form a macro-ejector, generates a thrust augmentation of roughly 1.1-1.2 compared to simple thrusters without the shroud. The tail ejectors 109, 110 themselves can also produce a thrust augmentation of above 2, perhaps close to 3:1. As such, instead of obtaining a unit of thrust by simply using two turbojets, a total thrust augmentation of minimum 2*1.1=2.2 and up to a maximum of 3*1.2=3.6 augmentation factor is obtained, allowing the take-off of a heavier vehicle. As it levels off to cruise conditions, the engines can be throttled back, and the augmentation also decreases to match and overcome drag and propel the vehicle forward in level flight.

Figure 7:
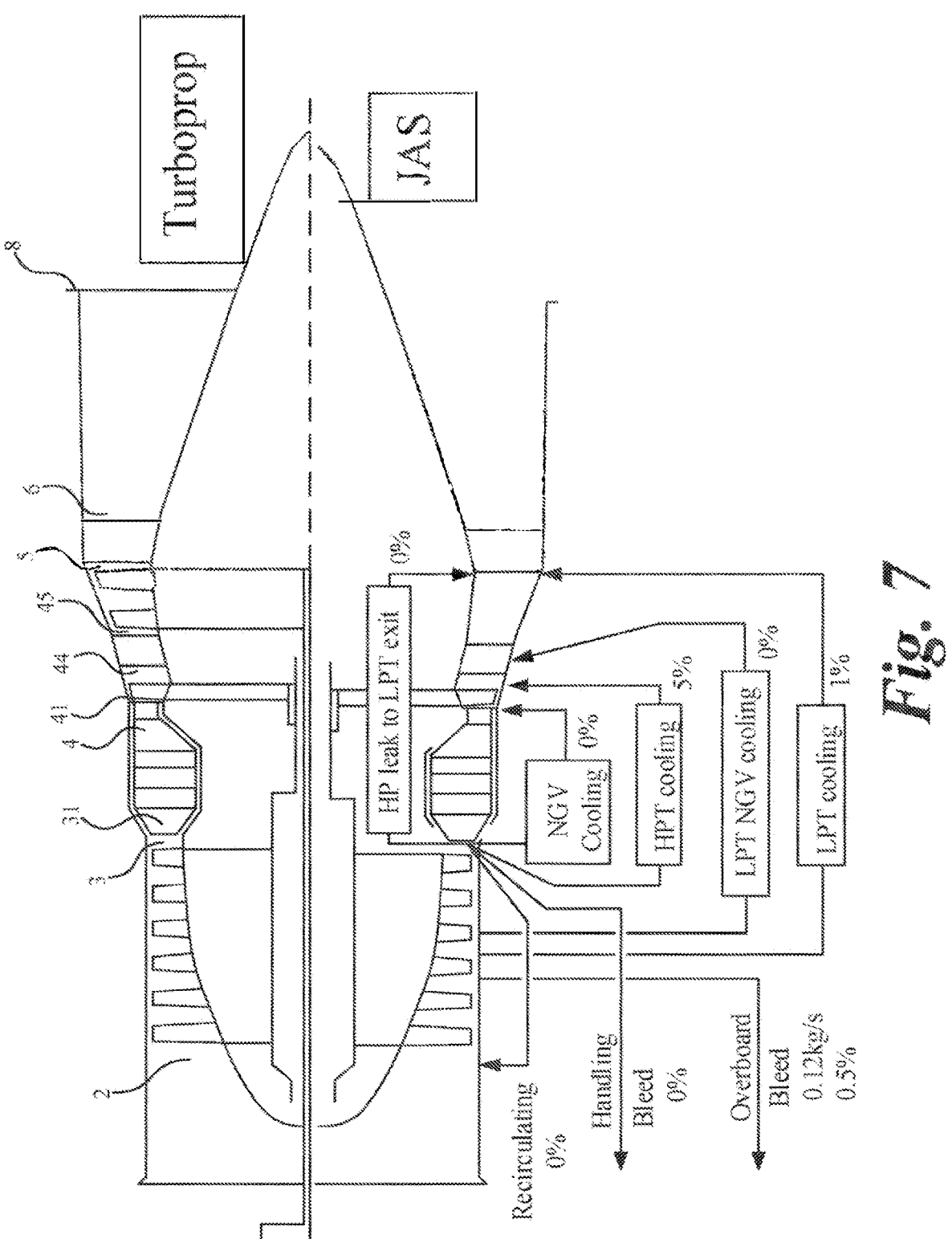
FIG. 7 illustrates the upper half of a turboshaft/turboprop engine with highlights of the stations of the flow according to an embodiment of the present invention.

FIG. 7 illustrates the upper half a turboshaft/turboprop engine with highlights of the stations of the flow. The bottom half contains the same engine stripped of the shall and turbine driving the shaft (free turbine driving the propeller, in this case) and using the gas generator to drive a jet augmenting system of the preferred embodiment of the present invention. FIG. 7 shows the changes that would be optionally advantageous for transforming a turboshaft designed engine into a gas generator for the jet augmenting system and highlights the interchangeability of the disclosed system.

In FIG. 7, a puller propeller configuration is shown in the upper half. In contrast, one embodiment of the present invention has the shaft pointing to the right, where the pusher propeller is located. The top half contains a compressor, a combustor and two turbines, one connected to the compressor and one connected to the propeller via a shaft Station 2 represents a corepressor inlet; a compressor outlet station 3; a combustor inlet 31; a combustor outlet 4; a first turbine (connected to and driving the compressor) inlet 41; a first turbine outlet 44; an inlet 45 to the free turbine; an exit 5 from the free turbine, an outlet 6 from the turbine and exhaust; and exhaust (from the overall system) 8. The bleed system from station 3 is used in this embodiment as motive fluid for the front thrusters of the system The remainder of the working fluid is used by the gas generator to drive the free turbine, which is extracting power to drive the propeller. In the lower half, the system is stripped off the free turbine and the shaft (and implicitly the propeller), but all the other elements remain the same. The system is similar, with the first turbine driving the compressor, except the free turbine is eliminated, allowing the system to become a gas generator that produces at the station 44 a pressure a total pressure of 202.514 kiloPascals at a total temperature of 1248.65 Kelvin. This energy carrying flow can now be used as motive fluid for the tail ejectors 109, 110 of the jet augmenting system of the preferred embodiment of the present invention.

Other gas generators can be designed to produce, at normal operating conditions, a pressure ratio of around 2. An embodiment of the present invention can result in augmentation ratios exceeding 1.5 and various designs of the thrusters can reach up to and including 2.75:1 augmentation ratio. As such, a jet as system of this embodiment operating in these conditions can increase the thrust by 1.4-3 times. Conversely, the specific fuel consumption is reduced as the same amount of fuel is used to produce the conditions at station 44, and 1.4 times more thrust is obtained from the exhaust gas at that condition, used as motive fluid in the rear and front thrusters. When compared to the fuel consumption of conventional small turbojets, typically at 1.5 lb/hr per lbf, the specific fuel consumption with the disclosed jet augmenting system is lowered by 1.4 times, to around 1.07 lb/hr fuel per each lbf produced. One or more embodiments show a reduction of up to 2.0 times compared to the original 1.5 lb/hr of fuel per lbf produced, bringing the system to a highly performant 0.75 lb/hr fuel per each lbf thrust produced, without the use of a free turbine.

An embodiment of the present invention includes two rear gas generators; a first rear large, moveable thruster; a second rear, large, moveable thruster; transition piece to guide hot pressurized exhaust gas to rear thrusters from each rear gas generator; support thrusters; manifold, compressor bleed air; pipe linking bleeds manifold to control valve box; control valve that modulates both flow to front thrusters as additional motive fluid and balance between front thrusters primary flow supply; motor control valve; flexible line guiding compressed bleed air from control valve box to front thrusters; front thruster main body; front thruster flange; motor for swiveling the front thruster; shaft; end panel/winglet canard wing; front moveable canard; a first design box wing and control surfaces (rudder, elevens, elevator); a second design box wing; a design sweptback box wing; central fin and rudder; main box of fuselage carrying tank, gas generator, controls; and front fuselage; and front gas generators for the front thrusters.

Figure 12:
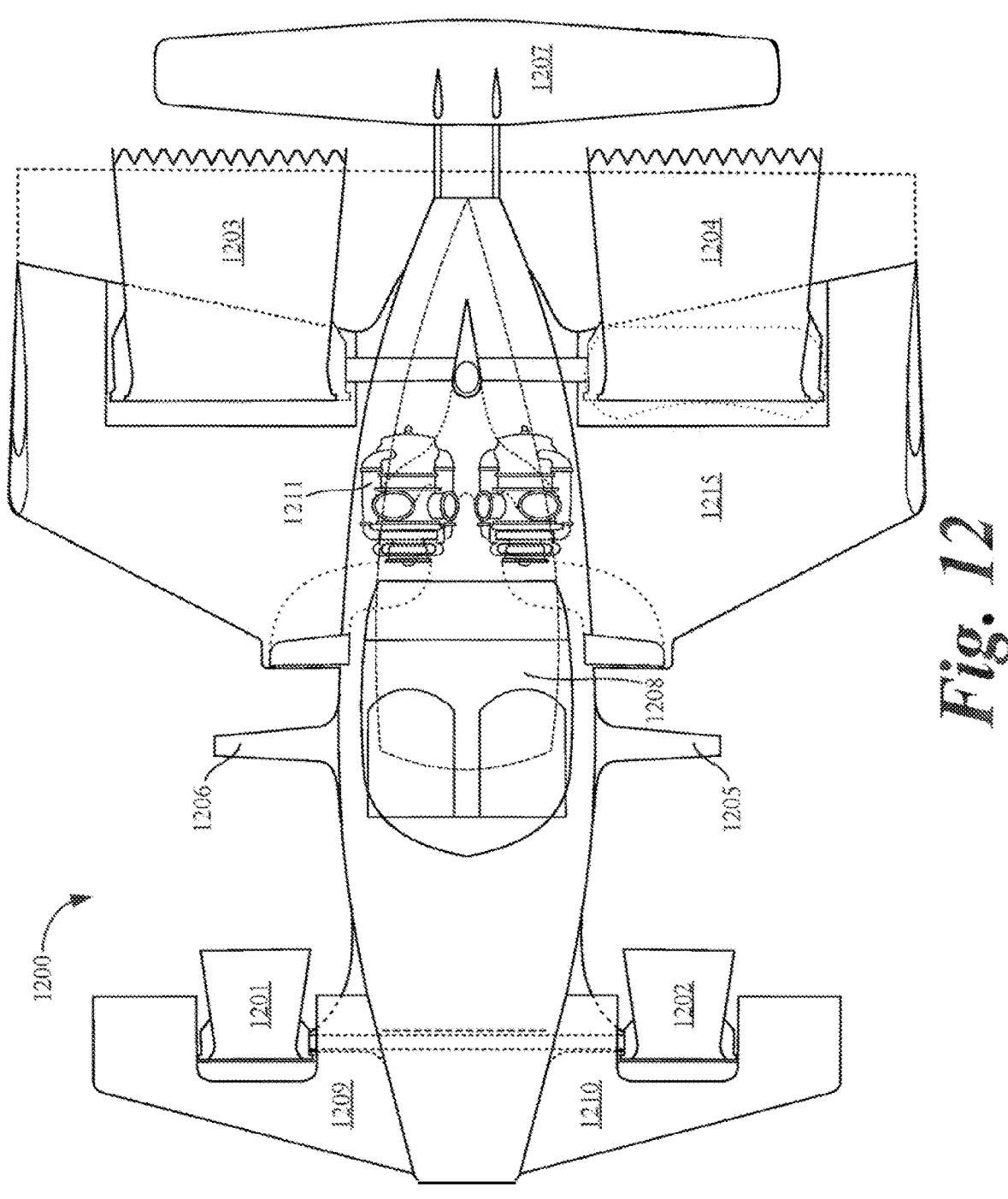
FIG. 12 is a top view of an alternative embodiment of the present invention
Figure 13:
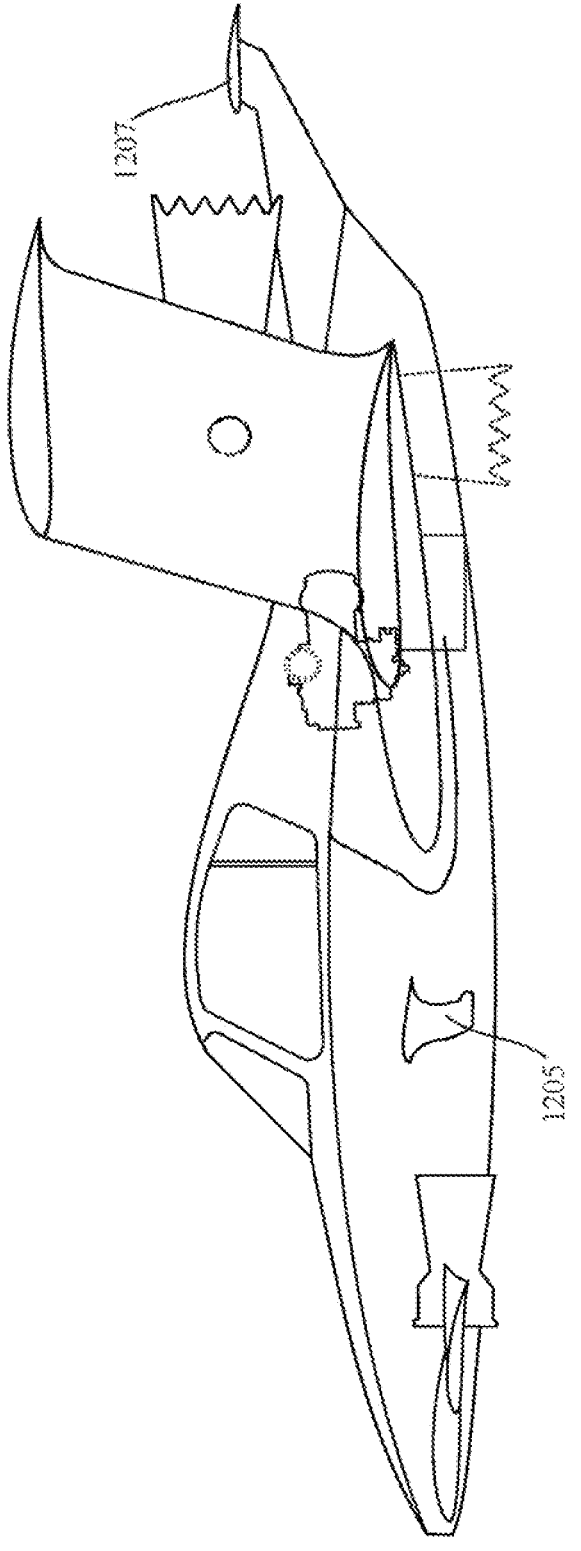
FIG. 13 is a side cross-sectional view of the embodiment shown in FIG. 12.
Figure 14:
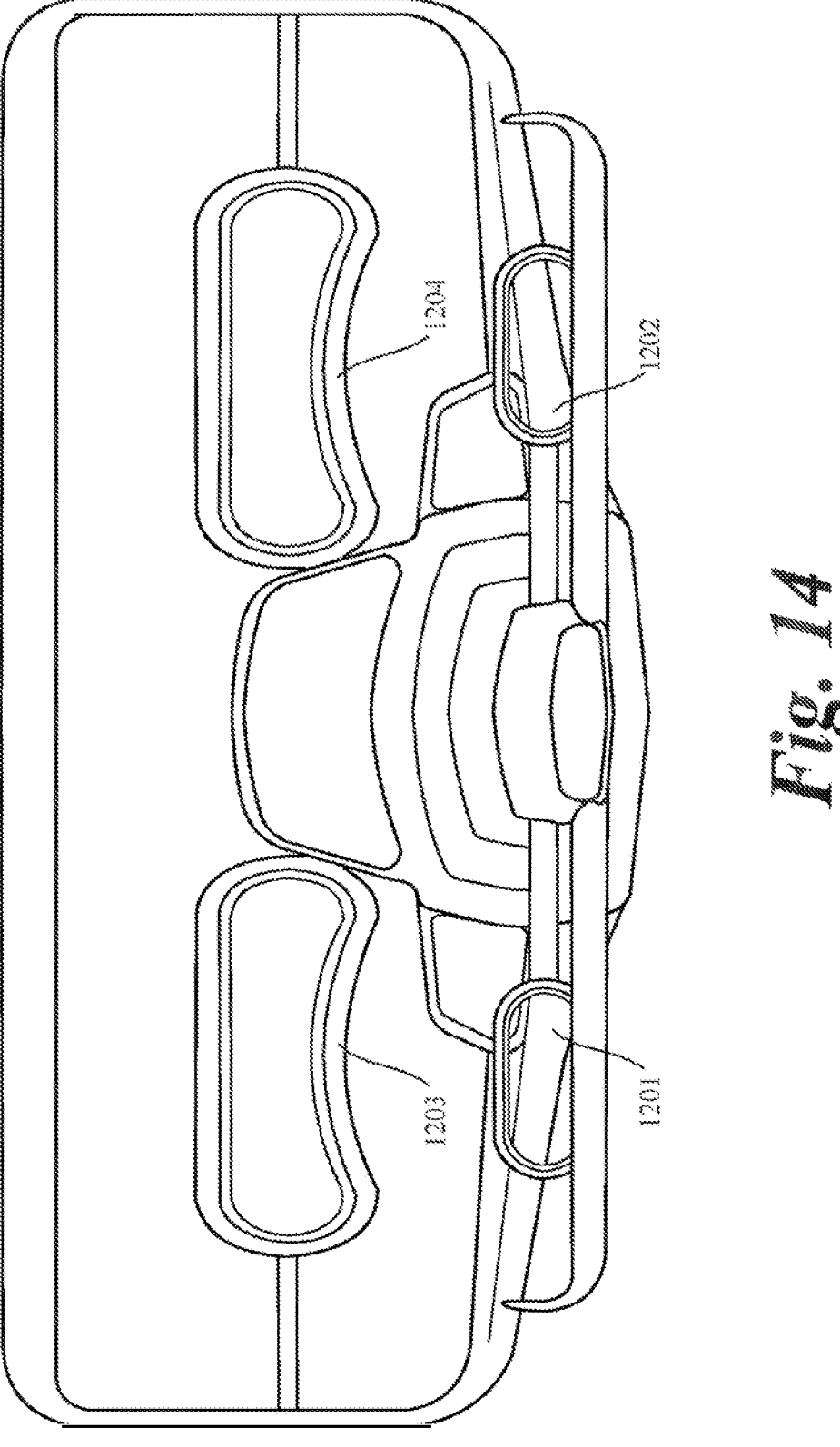
FIG. 14 is a front view of the embodiment shown in FIG. 12.
Figure 15:
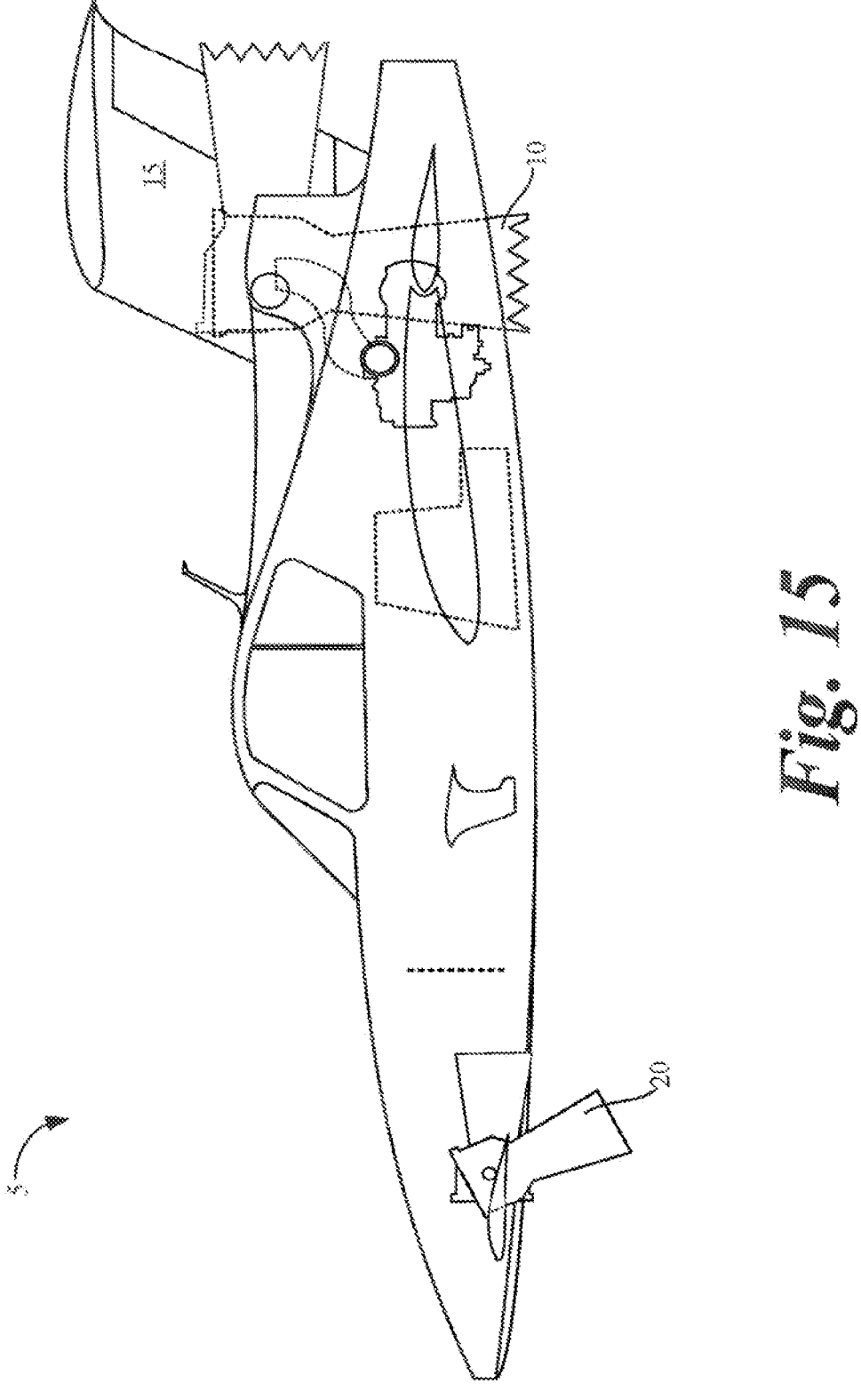
FIG. 15 is a side cross-sectional view of the embodiment shown in FIG. 8 during the take off to cruise transition.
Figure 16:
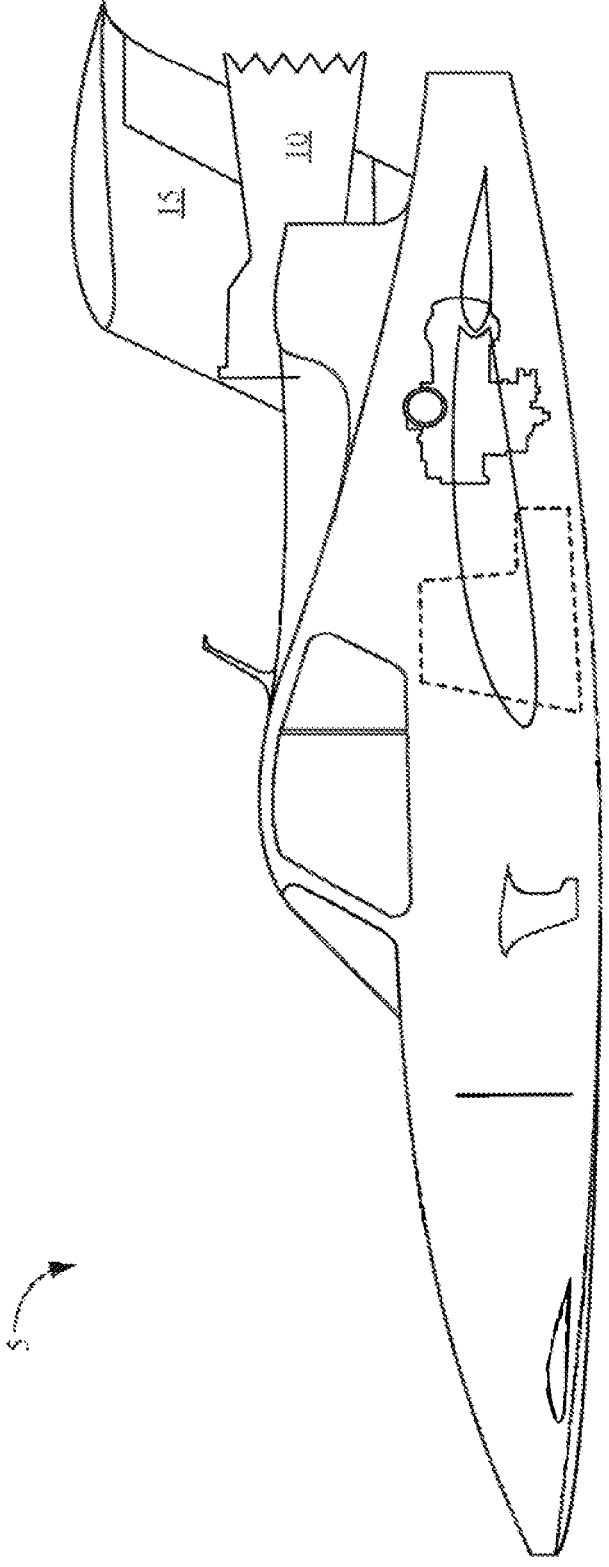
FIG. 16 illustrates the cruise position of the embodiment shown in FIG. 8.

FIGS. 8-11 illustrate different perspective views of one embodiment of the invention having a jet-augmenting propulsive system with particular emphasis on VTOL capabilities. FIGS. 12-14 illustrate different perspective views of another embodiment including control airfoils. In FIGS. 15 and 16, the flying vehicle is illustrated in a position of transition from vertical takeoff to cruise condition.

An embodiment of the present invention addresses the first issue of thrust-to-weight ratio and sizing of the engine through enhancing and augmenting the thrust and using several gas generators distributed throughout the flying vehicle. In a preferred embodiment of the present invention, the thrusters themselves are designed to allow for augmentation exceeding 2:1 and close to 3:1. This means that these thrusters are designed to produce a thrust that is 2-3 times greater than the thrust produced by a conventional turbojet. Thrust augmentation designs are disclosed in the '389 Application.

In a preferred embodiment of the present invention, the thruster is used with a gas generator as a source for primary flows. FIGS. 8-11 illustrate a vehicle 5 according to an embodiment of the invention from different perspective views. In FIGS. 8-11, the vehicle 5 has a jet augmenting propulsive system with particular emphasis on VTOL capabilities. More specifically, vehicle 5 includes a main body 55 having a fore portion 60 and a tail portion 65. Main body 55 may include a cockpit portion 35 configured to enable manned operation of the vehicle 5. As with all flying/sailing craft, vehicle 5 has a starboard side and a port side. Fluid generators 45 a, 45 b are coupled to the main body 55 and produce fluid streams. In an embodiment, the fluid generators 45 a, 45 b are disposed in the main body 55. Tail conduits 70 a, 70 b are fluidly coupled to the generators 45 a, 45 b.

Fore fluid generators 25 *a*, 25 *b* are coupled to the main body 55 toward the fore portion 60. First and second fore ejectors 20 *a*, 20 *b* are fluidly coupled to the fore fluid generators 25 *a*, 25 *b* by first and second fore conduits 75 *a*, 75 *b*, coupled to the fore portion 60 and respectively coupled to the starboard side and port side. The fore ejectors 20 *a*, 20 *b* respectively include outlet structure (not shown, but similar to outlet structures 107, 108 illustrated in FIG. 1) out of which fluid from the fore fluid generators 25 *a*, 25 *b* flows at a predetermined adjustable velocity. Additionally, the entirety of each of the fore ejectors 20 *a*, 20 *b* is rotatable about an axis oriented parallel to the leading edges of the fore ejectors i.e., transverse axis) to provide thrust orientation with both forward and upward components, for example, allowing the vehicle 5 to take off and continue climbing at much steeper angles of attack and hence reducing the runway length needed.

At the end of the climb or during the climb, the fore ejectors 20 *a*, 20 *b* can be realigned to the main direction of flight or shut off completely by fuming off the fore fluid generators 25 *a*, 25 *b*, retracting the fore ejectors into the main body 55, and adapting the speed and operation of the gas generator accordingly, driving the rear propulsion system (e.g., tail ejectors 10 *a*, 10 *b*). At landing, the fore ejectors 20 *a*, 20 *b* can be swiveled 180 degrees to provide a thrust reverse against the direction of the landing, shortening the landing length. In an embodiment, the entirety of each of the fore ejectors 20 *a*, 20 *b* is rotatable about an axis oriented perpendicular to the leading edges of the fore ejectors.

First and second tail ejectors 10 *a*, 10 *b* are fluidly coupled to the tail conduits 70 *a*, 70 *b* and coupled to the tail portion 65. The tail ejectors 10 *a*, 10 *b* include outlet structure (not shown, but similar to outlet structures 113, 114 illustrated in FIG. 1) out of which fluid from the tail conduits 70 *a*, 70 *b* flows at a predetermined adjustable velocity. Additionally, the entirety of each of the tail ejectors 10 *a*, 10 *b* is rotatable about an axis oriented parallel to the leading edges of the tail ejectors (i.e., transverse axis). In an embodiment, the entirety of each of the tail ejectors 10 *a*, 10 *b* is rotatable about an axis oriented perpendicular to the leading edges of the tail ejectors.

A primary airfoil element 15 is coupled to the tail portion 65. Element 15 is located directly downstream of the fore ejectors 20 *a*, 20 *b* such that the fluid from the fore ejectors flows over at least one aerodynamic surface of the primary airfoil element. In an embodiment, the primary airfoil element 15 is a closed wing having similar to elements 121, 122 and 123 illustrated in and discussed with reference to FIG. 1) a leading edge and a trailing edge, the leading and trailing edges of the closed wing defining an interior region. Tail ejectors 10 *a*, 10 *b* are at least partially disposed within the interior region (i.e., between the leading edge and trailing edge) and are controllably movable (e.g., advancement, retraction, etc.) within the interior region relative to the airfoil element 15. As such, a shroud is formed by primary airfoil element 15 around the tail ejectors 10 *a*, 10 *b*, thereby forming a macro-ejector.

The vehicle 100 further includes first and second canard wings 30 *a*, 30 *b* coupled to the fore portion 60 and respectively coupled to the starboard side and port side. The canard wings 30 *a*, 30 *b* are configured to develop boundary layers of ambient air flowing over the canard wings when the vehicle 5 is in motion. The canard wings 30 *a*, 30 *b* are respectively located directly upstream of the fore ejectors 20 *a*, 20 *b* such that the fore ejectors are fluidly coupled to the boundary layers. The fore ejectors 20 *a*, 20 *b* respectively include inlet portions (i.e., similar to inlet portions 119, 120 illustrated in and discussed with reference to FIG. 1), and the fore ejectors are positioned such that the boundary layers are ingested by the inlet portions. The first and second canard wings 30 *a*, 30 *b* each have a leading edge, and the entirety of each of the first and second canard wings is rotatable about an axis oriented parallel to the leading edge.

During level flight, further augmentation can be achieved through a secondary, major ejector that can be formed by using the exhaust. from the thrusters 10 *a*, 10 *b* in conjunction with, for example, the boxed wing 15 of the vehicle 5 acting as a shroud. The wings may also take any other shape that is designed in such a way to allow the high-speed exhaust of the thrusters 10 *a*, 10 *b* to serve as primary nozzle for the ejector formed by the wing 15 ("shroud") and thrusters. The effects of the shroud can further augment the thrust by at least 10-25%. In effect, the thrusters 10 *a*, 10 *b* and the shroud can have a combined effect of thrust augmentation of, for example, 1.1 (from shrouded thrusters) times 2.5 (from Thrusters) augmentation, which results in a total augmentation of 2.75. Therefore, one skilled in the art would appreciate that such a system would produce a thrust that defeats the drag of the vehicle moving at speed, by augmenting an otherwise ~2.75 thrust generated by a simple turbojet.

The thrusters 10 *a*, 10 *b* combined with the box wing 15 generate additional thrust augmentation. This effect is particularly useful when taking-off The thrusters 10 *a*, 10 *b* become the primary nozzle of a classical ejector. Then the shroud (together with the thrusters 10 *a*, 10 *b* to form a macro-ejector) generates a thrust augmentation of roughly 1.1-1.2 compared to the simple thrusters without the shroud. The thrusters 10 themselves can also produce a thrust augmentation of above 2, close to 3:1 if thrusters according to an embodiment are used. As such, instead of obtaining a unit of thrust by simply using, the two turbojets, a total thrust augmentation of minimum 2*1.1=2.2 and up to a maximum of 3*1.2=3.6 augmentation factor is obtained, allowing the take-off of a heavier vehicle. As it levels of to cruise conditions, the engines are throttled back, and the augmentation also decreases to match and overcome drag and propel the vehicle 5 forward in level flight.

In any aircraft which takes off vertically, the aircraft would naturally need to adjust its attitude to level off at the acceptable attitude and reduce its thrust in order to keep the aircraft flying forward at a constant cruise speed. Thrust reduction via throttle reduction may adjust the power needed to overcome the drag of the aircraft only, which may also mean a lesser augmentation of the entire system and sufficient to propel the aircraft forward and maintain its speed.

In one embodiment of the present invention, a 1500-lbs aircraft may employ two 300-lbf turbojets adapted to become a gas generator in the rear of the aircraft (Rear Gas Generators) and another two 150 lbf class turbojets adapted to become a gas generator in the nose of the aircraft (Forward Gas Generators). In this embodiment, these thrust augmenting ejectors can produce an augmentation of, for example, 1.75 times the original, which means 300 multiplied by 1.75, which results in 525 lbf augmented thrust for each thruster, therefore a total of 1050 lbf in the rear of the aircraft. The thrusters 10 may be swiveled to point downwards by rotation of the thrusters or by rotation of the entire gas generator and thruster assembly. As the flying vehicle 5 gains altitude, the thrusters 10 or entire assembly gas generator-thrusters rotate in the forward moving, level flight position, with the thrusters' hot gases oriented through the box wing 15 forming a shroud, at final level flight position.

With a wing such as a boxed structure around the main thrusters 10 a, 10 b to shroud these thrusters in level flight, the overall augmentation of the thrust becomes, for example, e.g., 1.15 multiplied by 525 lbf, resulting in 603.75 lbf and hence rapidly accelerating the vehicle forward.

The forward generators 25 a, 25 b would similarly augment the thrust to obtain ~525 lbf combined in the forward area of the aircraft 5, balancing the vehicle and providing a safe takeoff and landing attitude Once the vehicle 5 is at safe altitude and forward speed, the forward generators 25 a, 25 b may be shut down and their associated forward thrusters 20 may be retracted inside the fuselage to reduce drag. The forward thrusters 20 may be extended again when close to landing or transitioning to hover, concomitantly with the forward gas generator restart. It should be noted that thrusters 10, 20 can include or consist of turbojets and/or turbo-propellers.

As the fuel is consumed on board the vehicle 5, the weight of the vehicle becomes lighter and the acceleration of the vehicle becomes larger, hence increasing speed and acceleration. Because the vehicle 5 is inhabited, the accelerations need not exceed the current human-limited accelerations that are restricted for human safety and non-life-threatening standards. As such, after a short time, the vehicle 5 may have the ability to change its attitude and achieve level flight by throttle and control surface changes. Lift increases as the vehicle 5 changes its attitude, while the combined augmentation also diminishes in value due to the throttle pull back. The vehicle 5 may then achieve level flight by concomitantly reducing the engine load (ergo gas generator primary stream) to the thrusters 10 in the first level and allowing the boxed wing 15 to produce the lift necessary to maintain the attitude, while the thrusters only produce enough thrust to overcome drag.

Conversely, on approach to the destination, the attitude of the aircraft 5 can be adjusted with an increased angle of attack and the thrust augmentation again displaces the need for lift, as the forward speed reduces and the aircraft eventually can land vertically, on its tail, balanced by the thrusters 10, 20 and its combined augmentation effect.

One or more embodiments of the present invention are able to overcome the second issue of balancing the forces and moments by having smaller moment arms that are needed to balance them around the center of mass, which is achieved by having a distribution of thrust across various locations in the aircraft. This, in turn, allows these embodiments to have more control and makes it easier to maintain a hover/upright position.

As discussed in the '389 and '407 Applications, the unique technology allows for the distribution of thrust across various locations of the aircraft, with augmentation levels achieved in various thrusters (e g., in front, thrusters 20 behind the canard wings (movable canards) 30 a, 30 b, employed only at hovering phases take-off and landing and turned off at level flight and in the back, the "hot thrusters" 10 that generate the bulk of the thrust).

Figure 8:
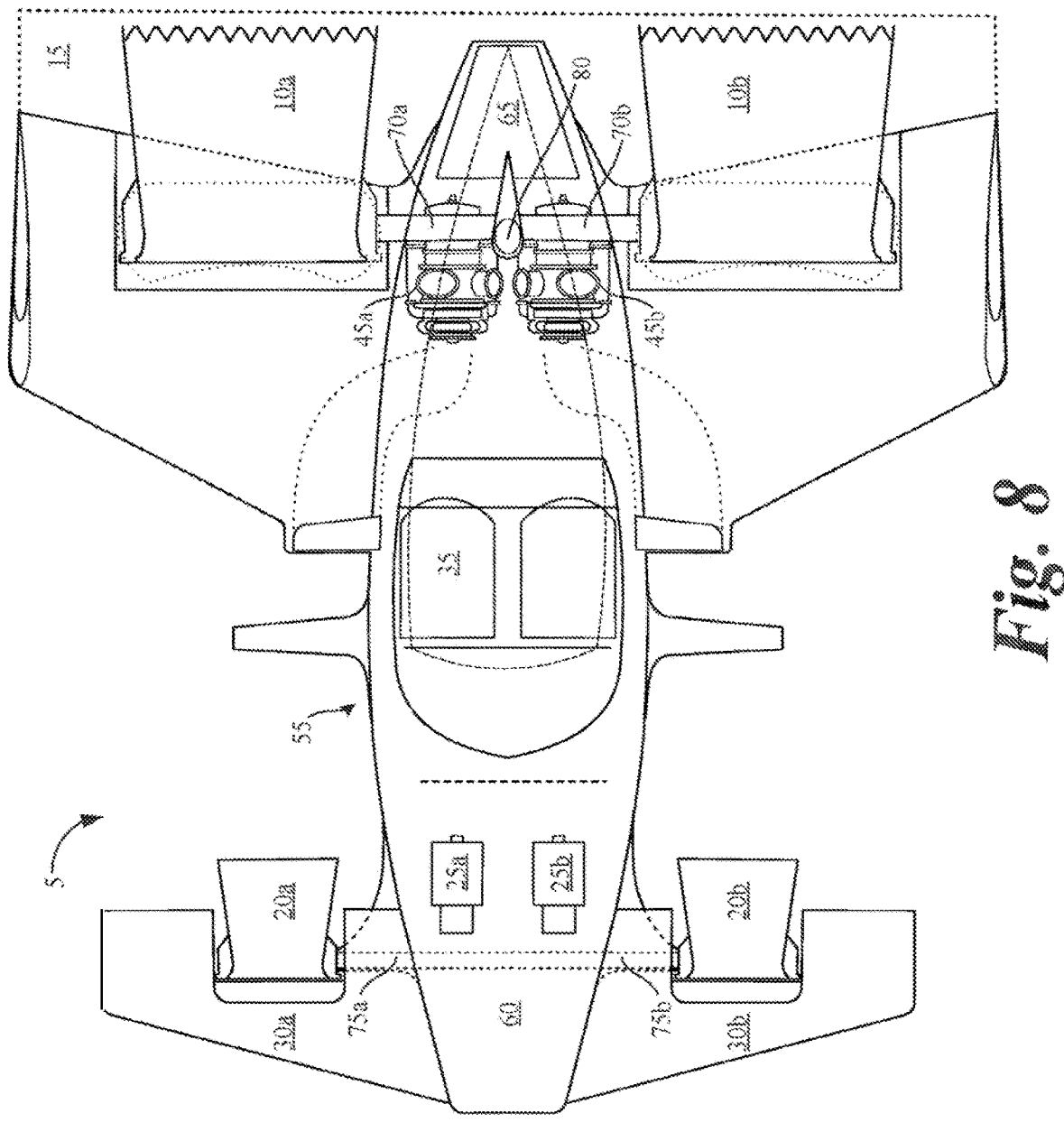
FIG. 8 illustrates one embodiment of the present invention in a top view.
Figure 9:
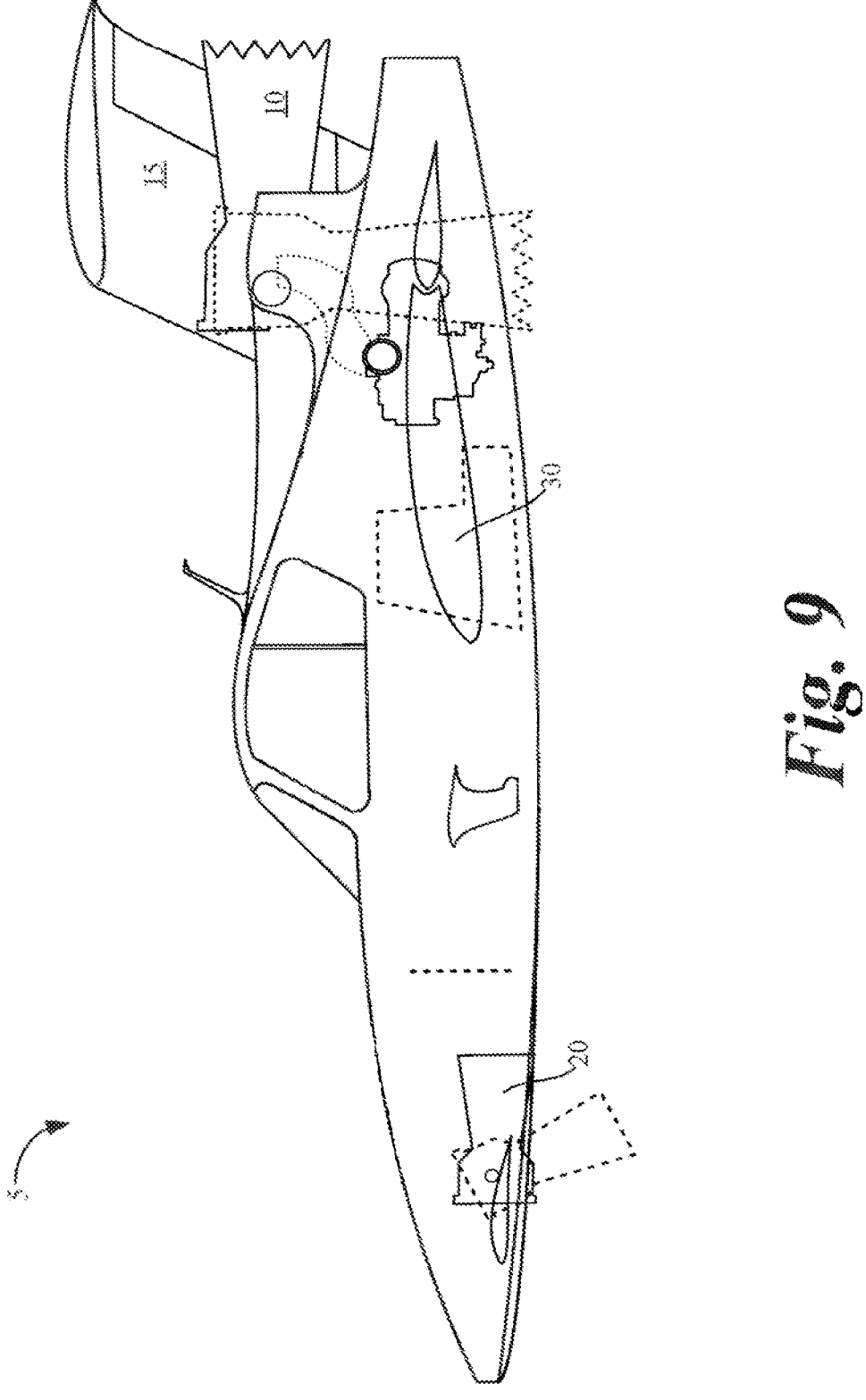
FIG. 9 is a side cross-sectional view of the embodiment shown in FIG. 8.
Figure 10:
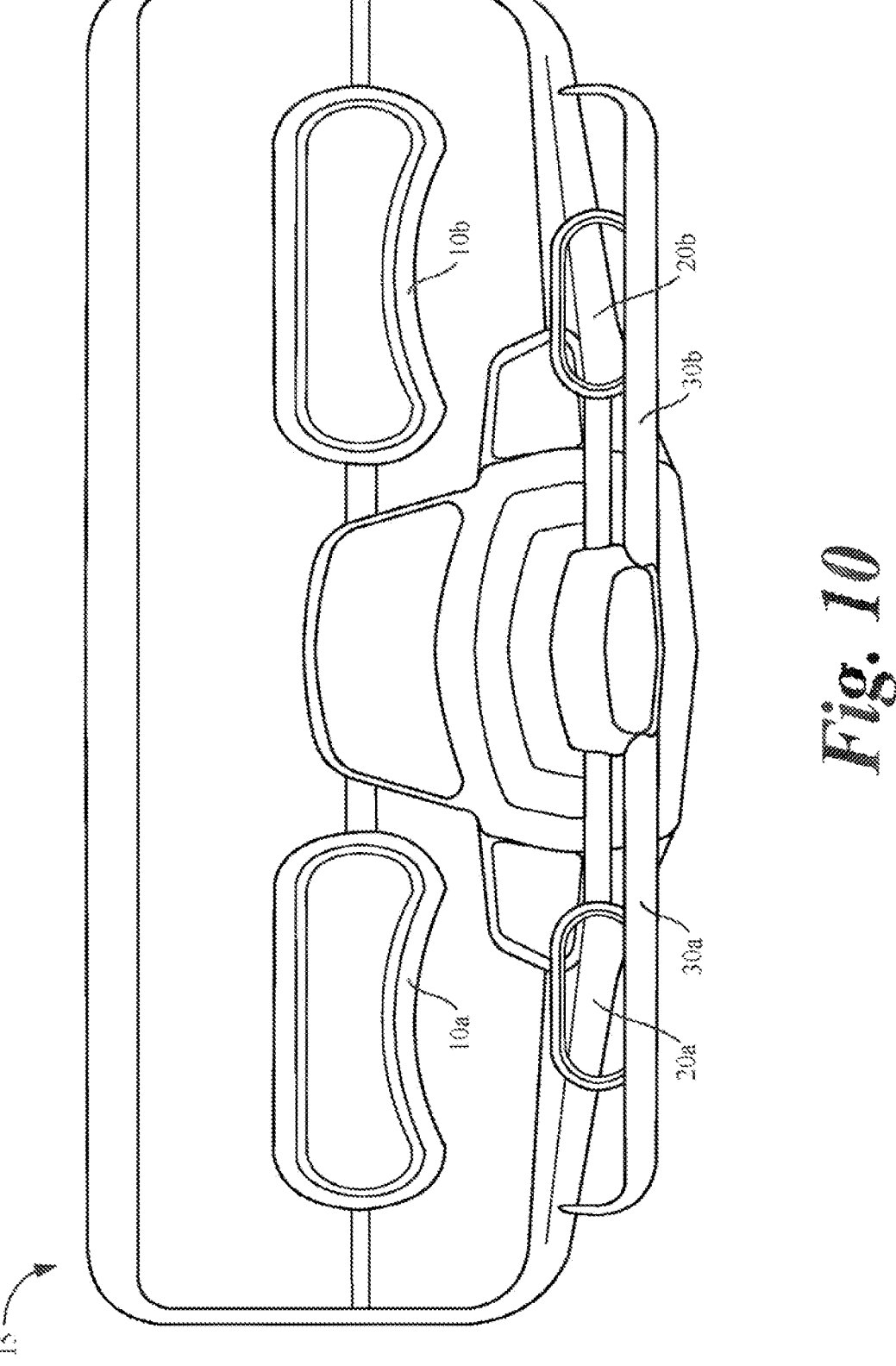
FIG. 10 is a front view of the embodiment shown in FIG. 8
Figure 11:
FIG. 11 is a rear view of the embodiment shown in FIG. 8.

In the embodiment of a 1500 #heavy vehicle 5 of FIG. 8, two smaller forward generators 25 a, 25 b are placed in the nose of the vehicle each feeding a smaller thruster 10 a, 10 b. The role of these forward generators 25 a, 25 b and thrusters 20 a, 20 b, which are placed near the canards 30, is to assist the take off by balancing the moments and forces in conjunction with the rear, larger thrusters, 10 and attain the level flight condition for which sufficient lift force is generated b the aerodynamic features of the vehicle 5 and complemented by the rear thrusters system.

At the point where the lift generated by the vehicle 5 becomes sufficient, the forward generators 25 a, 25 b and thrusters 20 shut all and retract within the fuselage, reducing the drag and allowing high speed of the vehicle when only the rear thrusters 10 operate.

In one embodiment a 1500 #Flying Vehicle uses a combined 500 k augmenting thrusters 20 in the nose, supplied with gas by two forward generators 25 a, 25 b modified from 1.50 lbf turbojets. An augmentation of 1.75 yields a thrust of 262.5 lbf for each of the systems, for a combined nose thrust of 525 lbf. These forward generators 25 a, 25 b are gradually throttled back and eventually shut off when the vehicle 5 has reached the speed at which the aerodynamic lift force is sufficient, the thrusters 10 a, 10 b have completely swiveled into cruise position and produce a thrust enough to overcome drag.

On approach and landing, the front thrusters 20 are once again started with some assist from hot bleed air off the generators' 45 a, 45 b compressor discharge ports, to complement the lift reduction and allow the vehicle 5 to be controlled, while the rear thrusters 10 re-orient in landing/take off position.

A conventional small (<1500 lbf thrust) mini jet engine usually provides thrust at a single location, typically at the center of the exhaust section. Some small turbofans also provide the thrust in a concentrated point on the aircraft. One or more embodiments of the present invention allow the distribution of the thrust in a nearly linear and/or non-circular manner, as opposed to a circular manner as is the case in the existing prior art, and thus distribute the thrust per the length of a wing or other airfoils and/or control surfaces of an aircraft. In the vehicle 5, all gas generator and compressor bleed air streams may be used as motive fluids for the augmenting thrusters. Because this embodiment allows the distribution of the thrust in a linear, mainly non-circular and distributed, not at a concentrated point, it achieves better propulsive efficiency of the aircraft. In addition, there is the optionally advantageous feature of molding and shaping the thruster according to the shape of the airfoils to obtain better performance (e.g., increasing the stall margin of a given canard wing if thruster is placed downstream of it, or augmenting the lift on a main wing if the thruster is placed at an optimal location upstream of said main wing. The distributed thrust improves the performance of the aircraft by distributing an otherwise e.g. 600 lbf turbojet hot and fast stream from a concentrated location at the back of the turbojet engine in, for example, at least four locations on the aircraft. In addition, it would allow VTOL or STOL. In this example, thrusters are mounted at these four locations on the vehicle in an optimal manner, such that they are (i) receiving the pressurized air or gas stream from the compressor bleed system and exhaust of the gas generator respectively or a combination thereof and (ii) augmenting each of the four thrust forces that would otherwise result from the simple isentropic expansion of the four primary streams by 1.5-3 times. This also results in an advantageous distributed flow and thrust from the four locations, thus enhancing the aircraft maneuverability and propulsive efficiency.

FIGS. 15-16 illustrate the progression from take-off to level cruise flight of a vehicle 5 that has moveable rear thruster(s) 10 on the tail-end and retractable nose thruster(s) 20 on the front-end, with the nose thruster(s) being responsible for the fine tuning of the aircraft attitude in flight up to level flight (cruise) One of the advantages of this embodiment is that the nose thrusters 20, being smaller and employing hot gases from the forward generators 25 a, 25 b as primary fluid, do not necessarily need to swivel a lot or even at all to control the attitude if control surfaces are placed in position downstream of them, while the rear thrusters 10, being larger and operating with exhaust gas from the generators 45 *a*, 45 *b*, can be swiveled to maintain the altitude and attitude of the aircraft and drive its orientation in flight to the desired position and attitude. The nose thrusters 20 could then be shut down by shutting off the forward generators 25 *a*, 25 *b*, and/or retracted inside the fuselage, allowing the vehicle to fly only on the rear engines operating at throttle pulled condition (less than 100% speed) and still generate hot gases to supply the hot thrusters 10 with primary fluid. An augmentation of 2:1 is still possible in level flight, with minor or no contribution from the boxed wing 15 acting as shroud for the larger or macro-ejector formed by the hot thruster(s) and wing itself.

An embodiment includes a turboprop STOL version of the present invention, The turboprop version of the augmented propulsion system consists of the same front system of augmentation of thrust based on motive fluid provided by the two nose gas generators. The bleed system of the generators 45 *a*, 45 *b* may also be employed in further augmentation of the front thrusters, by providing the port and starboard front thrusters 20 *a*, 20 *b* with additional motive air from the bleed of the rear gas generators' compressors. The front thrusters provide an augmentation corresponding to specific thrust of 100-300 lbf for each lb/sec of motive air of exhaust gas provided by the bleed system and front gas generators exhaust This value exceeds by far the typical 50-65 lbf/lb/sec specific thrust obtained with small turbojet engines, due to limited efficiencies of the components and lack of advanced technologies. When turned into a gas generator, the value of the compressed air and exhaust gas combined is utilized by employing the thrusters in front and back of the system resulting in augmentation ratios of over 2:1. As such, more thrust can be obtained from the same energy input.

In an embodiment, a control valve is employed to provide the balance of flow between the port and starboard thrusters 10 *a*, 10 *b*. The modulation of the air can be obtained with valves placed between the engine bleed and the control valve box 80. The valves allow for control of the flow on each thruster and/or balance of the flow of the motive air between the two front thrusters by opening or closing a passage to one or both of the front thrusters and changing the motive fluid supply. This, in turn, generates an imbalance in thrust, and the imbalance results in the change in the aircraft attitude. The thrusters can also be swiveled around their main axis, while being modulated for primary flow (motive fluid flow) at the same time. This allows for control on the pitch and roll as well as some limited control on the yaw, and combinations thereof.

An embodiment includes a jet augmenting propulsive system STOL version of the present invention. In this embodiment, the vehicle rear propulsion system consists of a jet augmenting system. Turbojets supply a high-speed exhaust gas through the box wing of the aircraft, produce in effect an augmentation of at least 1.05 and up to 1.15 times their original thrust. Turbojets are delivering in effect the motive gas to augment the thrust in a macro-ejector whose shroud is the box wing itself. The jet augmenting system is specifically designed to allow fast movement of the vehicle at the cost of additional fuel consumption, resulting in airspeeds of the vehicle exceeding 200 MPH and propulsive efficiencies exceeding 75%. The system results in a typical specific fuel consumption of 1.3-1.4 lb/hr of fuel per lbf generated, which is more economical than the 1.5 typical rate of the small turbojets. These levels are much more performant than the typical 1.5 lb/hr per lbf usually obtained with small turbojets, the majority of current markets for drones. The system can also achieve the performance of specific fuel consumption of a low-bypass turbofan at much smaller scale and without employing a free turbine and a fan, per se, reducing thus the weight and complexity of the entire propulsion system and eliminating a large, moving assembly such as the fan/free turbine assembly.

Alternatively, or in addition to, if the mission of the aircraft is longer duration/range and slower airspeeds at higher propulsive efficiencies, then the rear section of the propulsive system can be made flexible enough to be replaced by a turbine/propeller system while keeping the common, identical gas generator (front of the propulsive system) and augmenting thrusters. The turbine will receive the same flow as in the case of the jet augmenting system, but will extract the energy from the gas generator exhaust flow and turn it into mechanical work used to rotate the propeller rather than fluidically augment the flow in an ejector type thruster. The interfaces are very similar, the replacement consisting of the removal of the transition piece conduit with a conduit that guides the hot, pressurized gases towards the free turbine driving the propeller, after which the exhaust gases are expelled in the downstream direction and into the wash of the propeller The advantage of such a flexible system is that with the similar arrangement, a turbopropeller pusher or a jet augmenting system can be interchangeable, allowing the customer to choose the system based on the mission at hand. As such, a turbopropeller pusher system as described can achieve a specific fuel consumption level of below 0.6 lb/h per each horsepower or equivalent thrust lbf achieved. In one embodiment of the present invention, the flying vehicle may be able to transport a single person as far as 200 miles away moving at an average cruise speed of 150 mph.

Furthermore, the propeller can be perfectly contained by, for example, the box wing system described elsewhere, and thus the noise generated by the turboprop can be significantly reduced by direct (box wing) and indirect means (noise abatement materials inside the wing). In addition, the turboprop still benefits from the presence of the front thrusters and the use of bleed air to power them, allowing not only VTOL but, where appropriate and VTOL not necessary, short take-off and landing.

In one or more embodiments of the present invention, the short take-off and landing (STOL) concept can be achieved by the employment of the front thrusters, significantly lowering the runway length required for take-off. By swiveling the thrusters, additional vectored thrust can be oriented to increase pitch during take-off and reduce the length needed as compared to a conventional aircraft. The front thrusters may be shut off during cruise or loitering, or re-activated at various stages of the flight, to augment lift, or thrust or both. The augmentation of the thrust can be accomplished through the very design of the thrusters. The augmentation of the lift can be accomplished by the placement of the front thrusters in relation to both the canard (front wings) and the main box wing. The downstream location of the front wing delays stall of the front wings, allowing operation at higher angles of attack and higher lift coefficients before stall occurs. This is due to the lower pressure created in front of the thrusters, delaying the separation on the top of the wing, the main cause of stall on most wings at high angles of attack. The lift augmentation due to the main wing is mainly due to the increased flow resulting from the front thrusters, locally higher than the airspeed of the vehicle, which said flow is guided over the bottom part of the box wing and, as known to those familiar with the matter, augmenting the lift of the main wing.

The same principles can be applied to a STOL embodiment. In an embodiment, a port front thruster is swiveled at an angle favoring the thrust orientation with both forward and upward components, allowing the vehicle to take off and continue climbing at much steeper angles of attack and hence reducing the runway length needed. At the end of the climb or during the climb, the front thruster can be realigned to the main direction of flight or shut off completely by turning off the bleed valves of the engine/gas generator and adapting the speed and operation of the gas generator accordingly, driving the rear propulsion system only (e.g., jet augmenting system or turbopropeller). After landing, the front thrusters can be swiveled 180 degrees to provide a thrust reverse against the direction of the landing, shortening the landing length.

In an embodiment, and referring to FIGS. 12-14, a vehicle 1200 has a jet augmenting propulsive system with particular emphasis on VTOL capabilities. More specifically, vehicle 1200 includes a main body similar to main body 55 having a fore portion and a tail portion. Main body may include a cockpit portion 1208 configured to enable manned operation of the vehicle 1200. As with all flying/sailing craft, vehicle 1200 has a starboard side and a port side. At least one fluid generator 1211 is coupled to the main body and produces a fluid stream. In an embodiment, the fluid generator 1211 is disposed in the main body. At least one fore conduit and at least one tail conduit are fluidly coupled to the generator 1211.

First and second fore electors 1201, 1202 are fluidly coupled to the at least one fore conduit, coupled to the fore portion and respectively coupled to the starboard side and port side. The fore ejectors 1201, 1202 respectively include outlet structure out of which fluid from the at least one fore conduit flows at a predetermined adjustable velocity. Additionally, the entirety of each of the fore ejectors 1201, 1202 is rotatable about an axis oriented parallel to the leading edges of the fore ejectors (i.e., transverse axis) to provide thrust orientation with both forward and upward components, for example, allowing the vehicle 1200 to take off and continue climbing at much steeper angles of attack and hence reducing the runway length needed. At the end of the climb or during the climb, the fore ejectors 1201, 1202 can be realigned to the main direction of flight or shut off completely by turning off the bleed valves of the engine/fluid generator 1211, retracting the fore ejectors into the main body, and adapting the speed and operation of the gas generator accordingly, driving the rear propulsion system (e.g., tail ejectors 1203, 1204). At landing, the fore ejectors 1201, 1202 can be swiveled 180 degrees to provide a thrust reverse against the direction of the landing, shortening the landing length. In an embodiment, the entirety of each of the fore ejectors 1201, 1202 is rotatable about an axis oriented perpendicular to the leading edges of the fore ejectors.

First and second tail ejectors 1203, 1204 are fluidly coupled to at least one tail conduit and coupled to the tail portion. The tail ejectors 1203, 1204 include outlet structure out of which fluid from the at least one tail conduit flows at a predetermined adjustable velocity. Additionally, the entirety of each of the tail ejectors 1203, 1204 is rotatable about an axis oriented parallel to the leading edges of the tail ejectors (i.e., transverse axis). In an embodiment, the entirety of each of the tail ejectors 1203, 1204 is rotatable about an axis oriented perpendicular to the leading edges of the tail ejectors.

In an embodiment, the fluid generator 1211 includes a first region in which the fluid stream is at a low temperature and a second region in which the fluid stream is at a high temperature. The at least one fore conduit provides fluid from the first region to the fore ejectors 1201, 1202, and the at least one tail conduit provides fluid from the second region to the tail ejectors 1203, 1204.

A primary airfoil element 1215 is coupled to the tail portion. Element 1215 is located directly downstream of the fore ejectors 1201, 1202 such that the fluid from the fore ejectors flows over at least one aerodynamic surface of the primary airfoil element. In an embodiment, the primary airfoil element 1215 is a closed wing having a leading edge and a trailing edge, the leading and trailing edges of the closed wing defining an interior region Tail ejectors 1203, 1204 are at least partially disposed within the interior region (i.e., between leading edge and trailing edge) and are controllably movable (e.g., advancement, retraction, etc.) within the interior region relative to the airfoil element 1215 As such, a shroud is formed by primary airfoil element 1215 around the tail ejectors 1203, 1204, thereby forming a macro-ejector.

The vehicle 1200 further includes first and second canard wings 1209, 1210 coupled to the fore portion and respectively coupled to the starboard side and port side. The canard wings 1209, 1210 are configured to develop boundary layers of ambient air flowing over the canard wings when the vehicle 1200 is in motion. The canard wings 1209, 1210 are respectively located directly upstream of the fore ejectors 1201, 1202 such that the fore ejectors are fluidly coupled to the boundary layers. The fore ejectors 1201, 1202 respectively include inlet portions (i.e., leading edges), and the fore ejectors are positioned such that the boundary layers are ingested by the inlet portions. Vehicle 1200 may further include control airfoils 1205, 1206, 1207.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A vehicle, comprising:
   a main body having a fore portion, a tail portion, a starboard side, a port side and a cockpit formed therein to accommodate a human pilot;
   a first fluid generator coupled to the main body and producing a first fluid stream;
   at least one tail conduit fluidly coupled to the first generator,
   first and second fore ejectors coupled to the fore portion and respectively coupled to the starboard side and port side, the fore ejectors respectively comprising an outlet structure out of which fluid flows at a predetermined adjustable velocity;

at least one tail ejector fluidly coupled to the at least one tail conduit and coupled to the tail portion, the at least one tail ejector comprising an outlet structure out of which fluid from the at least one tail conduit flows at a predetermined adjustable velocity;

a primary airfoil element having a leading edge and a trailing edge;

first and second control airfoils respectively coupled to the starboard and port sides and positioned between the fore portion and the primary airfoil element; and a third control airfoil coupled to the tail portion.

2. The vehicle of claim 1, further comprising first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

3. The vehicle of claim 2, wherein the first and second canard wings each have a leading edge, and the entirety of each of the first and second canard wings is rotatable about an axis oriented parallel to the leading edge.

4. The vehicle of claim 2, wherein the first and second fore ejectors respectively comprise first and second inlet portions, and the first and second fore ejectors are positioned such that the boundary layers are ingested by the inlet portions.

5. The vehicle of claim 1, further comprising:

second and third fluid generators coupled to the main body and respectively producing a second fluid stream and a third fluid stream; and first and second fore conduits respectively fluidly coupled to the second and third generators, wherein the first and second fore ejectors are respectively fluidly coupled to the first and second fore conduits and respectively receive the second and third fluid streams.

6. The vehicle of claim 1, wherein the first fluid stream produced by the first generator is the sole means of propulsion of the vehicle.

7. The vehicle of claim 1, wherein the first and second fore ejectors each have a leading edge, and the entirety of each of the first and second fore ejectors is rotatable about an axis oriented parallel to the leading edge.

8. The vehicle of claim 1, wherein the first and second fore ejectors are retractable into the main body during a cruise condition of the vehicle.

9. The vehicle of claim 1, wherein the at least one tail ejector has a leading edge, and the entirety of the at least one tail ejector is rotatable about an axis oriented parallel to the leading edge.

10. The vehicle of claim 1, wherein the tail ejector is controllably movable relative to the interior region while the vehicle is in flight.

11. The vehicle of claim 1, wherein:

the fluid generator comprises a first region in which the fluid stream is at a low temperature and a second region in which the fluid stream is at a high temperature;

the at least one fore conduit provides fluid from the first region to the first and second fore ejectors; and the at least one tail conduit provides fluid from the second region to the at least one tail ejector.

12. A vehicle, comprising:

a main body having a fore portion, a tail portion, a starboard side, a R-port side and a cockpit to accommodate a human pilot;

a first fluid generator coupled to the main body and producing a first fluid stream;

at least one tail conduit fluidly coupled to the first generator;

first and second fore ejectors coupled to the fore portion and respectively coupled to the starboard side and port side, the fore ejectors respectively comprising an outlet structure out of which fluid flows at a predetermined adjustable velocity;

at least one propeller fluidly coupled to the at least one tail conduit and coupled to the tail portion;

a primary airfoil element having a leading edge and a trailing edge;

first and second control airfoils respectively coupled to the starboard and port sides and positioned between the fore portion and the primary airfoil element; and a third control airfoil coupled to the tail portion.

13. The vehicle of claim 12, further comprising first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

14. The vehicle of claim 13, wherein the first and second canard wings each have a leading edge, and the entirety of each of the first and second canard wings is rotatable about an axis oriented parallel to the leading edge.

15. The vehicle of claim 13, wherein the first and second fore ejectors respectively comprise first and second inlet portions, and the first and second fore ejectors are positioned such that the boundary layers are ingested by the inlet portions.

16. The vehicle of claim 12, further comprising:

second and third fluid generators coupled to the main body and respectively producing a second fluid stream and a third fluid stream; and first and second fore conduits respectively fluidly coupled to the second and third generators, wherein the first and second fore ejectors are respectively fluidly coupled to the first and second fore conduits and respectively receive the second and third fluid streams.

17. The vehicle of claim 12, wherein the first and second fore ejectors each have a leading edge, and the entirety of each of the first and second fore ejectors is rotatable about an axis oriented parallel to the leading edge.

18. The vehicle of claim 12, wherein tare first and second fore ejectors are retractable into the main body during a cruise condition of the vehicle.

19. The vehicle of claim 12, wherein:

the fluid generator comprises a first region in which the fluid stream is at a low temperature and a second region in which the fluid stream is at a high temperature;

the at least one fore conduit provides fluid from the first region to the first and second fore ejectors; and the at least one tail conduit provides fluid from the second region to a turbine coupled to the at least one propeller.

* * * * *